US012773700B2

(12) United States Patent
Kang et al.

(10) Patent No.: US 12,773,700 B2
(45) Date of Patent: Oct. 27, 2026

(54) ELECTROSTATIC PRECIPITATOR AND CONTROL METHOD THEREOF

(71) Applicant: SAMSUNG ELECTRONICS CO., LTD., Suwon-si (KR)

(72) Inventors: Myungsoo Kang, Suwon-si (KR); Hyongsoo Noh, Suwon-si (KR); Myungseob Song, Suwon-si (KR); Kyuho Shin, Suwon-si (KR); Joonoh Shin, Suwon-si (KR); Hyeongjoon Seo, Suwon-si (KR); Kisup Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 482 days.

(21) Appl. No.: 18/237,757

(22) Filed: Aug. 24, 2023

(65) Prior Publication Data

US 2024/0139758 A1 May 2, 2024

Related U.S. Application Data

(63) Continuation of application No. PCT/KR2023/011695, filed on Aug. 8, 2023.

(30) Foreign Application Priority Data

Oct. 26, 2022 (KR) ........................ 10-2022-0139761

(51) Int. Cl.
*B03C 3/68* (2006.01)
*B03C 3/08* (2006.01)
*B03C 3/45* (2006.01)

(52) U.S. Cl.
CPC .................. *B03C 3/68* (2013.01); *B03C 3/08* (2013.01); *B03C 3/45* (2013.01)

(58) Field of Classification Search
CPC .. B03C 3/12; B03C 3/68; B03C 3/017; B03C 3/08; B03C 3/38; B03C 3/41; B03C 3/45;
(Continued)

(56) References Cited

U.S. PATENT DOCUMENTS 2,565,458 A * 8/1951 Weisz ........................ B03C 3/45 96/85
3,883,328 A * 5/1975 Spain ........................ B03C 3/60 96/66
(Continued)

FOREIGN PATENT DOCUMENTS

JP 2000000488 A * 1/2000 ............. B03C 3/368
JP 2013-91058 5/2013
(Continued)

OTHER PUBLICATIONS

International Search Report dated Nov. 29, 2023 issued in PCT Application No. PCT/KR2023/011695.
(Continued)

*Primary Examiner* — Jennifer Dieterle
*Assistant Examiner* — Sonji Turner
(74) *Attorney, Agent, or Firm* — STAAS & HALSEY LLP

(57) ABSTRACT

An electrostatic precipitator includes: a charging unit configured to charge foreign materials; and a dust collecting sheet configured to collect the foreign materials charged in the charging unit. The dust collecting sheet includes: a first electrode; a second electrode spaced apart from the first electrode to face the first electrode and configured to collect the foreign materials passed through the charging unit; a first power connector connected to the first electrode and configured to apply a voltage to the first electrode; a second power connector connected to the second electrode and configured to apply a voltage to generate a potential differ-
(Continued)

ence with respect to the first electrode to the second electrode; and a third power connector connected to the second electrode and configured to heat the second electrode. The third power connector is closer to the second power connector than to the first power connector.

17 Claims, 13 Drawing Sheets

(58) Field of Classification Search
CPC .... B03C 3/47; B03C 3/74; B03C 3/86; B03C 2201/04; B03C 2201/06; B03C 2201/10; B03C 2201/12
See application file for complete search history.

(56) References Cited

U.S. PATENT DOCUMENTS

| | | | | |
|---|---|---|---|---|
| 6,527,821 | B2 | 3/2003 | Liu et al. | |
| 10,933,431 | B2 | 3/2021 | Kochiyama et al. | |
| 10,994,283 | B2 | 5/2021 | Noh et al. | |
| 11,459,922 | B2 | 10/2022 | Sugimoto | |
| 2010/0236411 | A1* | 9/2010 | Chan | B03C 3/08 96/25 |
| 2018/0250685 | A1* | 9/2018 | Noh | B03C 3/41 |
| 2021/0001351 | A1 | 1/2021 | Yoo et al. | |
| 2021/0291199 | A1* | 9/2021 | Noh | B32B 3/06 |
| 2023/0097963 | A1* | 3/2023 | Kang | B03C 3/08 95/2 |

FOREIGN PATENT DOCUMENTS

| | | |
|---|---|---|
| JP | 2013-188708 | 9/2013 |
| JP | 6954144 | 10/2021 |
| KR | 2001-0101080 | 11/2001 |
| KR | 10-0561550 | 3/2006 |
| KR | 2009-127442 | 6/2009 |
| KR | 6028348 | 11/2016 |
| KR | 10-2017-0059125 | 5/2017 |
| KR | 10-2018-0101844 | 9/2018 |
| KR | 10-2013031 | 8/2019 |
| KR | 10-2126953 | 6/2020 |
| KR | 10-2021-0129762 | 10/2021 |
| KR | 10-2022-0021852 | 2/2022 |
| KR | 10-2022-0031787 | 3/2022 |
| KR | 10-2022-0032289 | 3/2022 |
| KR | 10-2407747 | 6/2022 |
| KR | 10-2023-0043449 | 3/2023 |
| KR | 10-2023-0132315 | 9/2023 |

OTHER PUBLICATIONS

Written Opinion dated Nov. 29, 2023 issued in PCT Application No. PCT/KR2023/011695.
Supplemental European Search Report dated Sep. 16, 2025 issued in European Application No. EP 23 88 2859.

* cited by examiner

ELECTROSTATIC PRECIPITATOR AND CONTROL METHOD THEREOF

CROSS-REFERENCE TO RELATED APPLICATION

This application is a continuation application, under 35 U.S.C. § 111(a), of international application No. PCT/KR2023/011695, filed on Aug. 8, 2023, which claims priority under 35 U.S.C. § 119 to Korean Patent Application No. 10-2022-0139761, filed on Oct. 26, 2022 in the Korean Intellectual Property Office, the disclosure of which is incorporated by reference herein in its entirety.

BACKGROUND

1. Field

The disclosure relates to an electrostatic precipitator, and more particularly, to an electrostatic precipitator with an improved sterilization function.

2. Description of the Related Art

In closed spaces, such as houses, rooms, shopping malls, factories, offices, etc., high-concentration aerosols may have a bad impact on people's health. Aerosols may be generated by smoking, cooking, cleaning, welding, grinding, etc. in a restricted space.

An electrostatic precipitator is an apparatus for removing aerosols and may be used in an air cleaner or an air conditioner having an air cleaning function.

The dust collecting unit of the electrostatic precipitator is configured with high voltage electrodes and low voltage electrodes, and foreign materials in the air, charged by the charging unit, are collected on the electrodes by electrical actions. At this time, the foreign materials collected on the electrodes include bio aerosols that are airborne microbes in the air, and the materials are grown on the electrodes to again spread to the indoor space.

SUMMARY

An electrostatic precipitator may include: a charging unit configured to charge foreign materials; and a dust collecting sheet configured to collect foreign materials charged in the charging unit.

The dust collecting sheet may include: a first electrode; a second electrode spaced apart from the first electrode to face the first electrode and configured to collect the foreign materials passed through the charging unit; a first power connector connected to the first electrode and configured to apply a voltage to the first electrode; a second power connector connected to the second electrode and configured to apply a voltage to generate a potential difference with respect to the first electrode to the second electrode; and a third power connector connected to the second electrode and configured to heat the second electrode.

The third power connector may be closer to the second power connector than to the first power connector.

The first electrode may overlap with the second electrode in a first direction.

The first power connector may be at one end of the dust collecting sheet in a second direction that is orthogonal to the first direction.

The second power connector may be at another end of the dust collecting sheet in the second direction.

The third power connector may be close to the other end of the dust collecting sheet in the second direction.

The second electrode may include a long side extending along the second direction and a cut portion cut along the long side.

The second power connector may be connected to one side of the second electrode in a third direction that is orthogonal to the first direction and the second direction with respect to the cut portion.

The third power connector may be connected to another side of the second electrode in the third direction with respect to the cut portion.

The first power connector may include a first contact area extending in the third direction that is orthogonal to the first direction and the second direction, the first contact area being in contact with a first power supply configured to supply power to the first electrode, and a first connection area extending in the second direction and to electrically connect the first connection area to the first electrode.

The second power connector may include a second contact area extending in the third direction and being in contact with a second power supply configured to supply power to the second electrode, and a second connection area extending in the second direction and to electrically connect the second connection area to the second electrode.

The third power connector may include a third contact area extending in the third direction and being in contact with a third power supply configured to supply power to the second electrode, and a third connection area extending in the second direction and to electrically connect the third connection area to the second electrode.

The first contact area may extend in the third direction along an entire of one end of the dust collecting sheet in the second direction.

The second contact area may extend in the third direction along an entire of another end of the dust collecting sheet in the second direction.

At least one portion of the third contact area may extend in the third direction in an inner side of the dust collecting sheet in the second direction.

The second electrode may include a long side extending along the second direction and a cut portion cut along the long side.

The second connection area may be connected to one side of the second electrode in the third direction with respect to the cut portion.

The third connection area may be connected to another side of the second electrode in the third direction with respect to the cut portion.

The second electrode may include a long side extending along the second direction and a cut portion cut along the third direction that is orthogonal to the first direction and the second direction.

The second power connector may be connected to one side of the second electrode in the third direction that is orthogonal to the first direction and the second direction.

The third power connector may be connected to another side of the second electrode in the third direction.

The cut portion may include a first cut portion and a second cut portion spaced apart from the first cut portion in the second direction.

The dust collecting sheet may include a first sheet covering one surfaces of the first electrode and the second electrode in the first direction, and a second sheet covering other surfaces of the first electrode and the second electrode in the first direction.

The first power connector, the second power connector, and the third power connector may be outside the second sheet.

The dust collecting sheet may include a first area in which the first sheet overlaps with the second sheet in the first direction, and a second area outside the second sheet in the first direction.

The first power connector, the second power connector, and the third power connector may be in the second area.

The second electrode may be made of a metal material.

The second electrode may be made of a material having higher electrical resistance than the first electrode.

The dust collecting sheet may include a first surface which the first electrode is on, a second surface which the second electrode is on, and a bending portion bent so that the first surface faces the second surface in the first direction.

At least one portion of each of the first power connector, the second power connector, and the third power connector may be on the bending portion.

The electrostatic precipitator may include a controller configured to control the first power supply, the second power supply, and the third power supply.

The controller may be configured to operate the electrostatic precipitator in one of a first mode and a second mode, and to change a mode between the first mode and the second mode based on the controlling of the first power supply, the second power supply, and the third power supply the first mode is in which the first power supply and the second power supply are controlled to apply a voltage to each of the first power connector and the second power connector and the second mode is in which the second power supply and the third power supply are controlled to apply a voltage to each of the second power connector and the third power connector.

The controller may be configured to turn on the first mode and then turn off the first mode based on a preset time or an input value.

The controller may be configured to turn on the second mode for a preset time after the first mode is turned off and then turn off the second mode.

An electrostatic precipitator according to a concept of the disclosure includes: a charging unit configured to charge foreign materials; and a dust collecting sheet configured to collect foreign materials charged in the charging unit.

The dust collecting sheet includes: a first electrode, a second electrode spaced apart from the first electrode to face the first electrode in a first direction, extending in a second direction that is orthogonal to the first direction, and configured to collect the foreign materials passed through the charging unit, a first power connector electrically connected to the first electrode, configured to apply a voltage to the first electrode, and being at one end of the dust collecting sheet in the second direction, a second power connector electrically connected to the second electrode and configured to apply a voltage to generate a potential difference with respect to the first electrode to the second electrode, the second power connector being at another end of the dust collecting sheet in the second direction, and a third power connector electrically connected to the second electrode additionally and configured to heat the second electrode, the third power connector being close to the other end of the dust collecting sheet in the second direction.

The second electrode may include a cut portion cut along the second direction.

The second power connector may be connected to one side of the second electrode in a third direction that is orthogonal to the first direction and the second direction with respect to the cut portion.

The third power connector may be connected to another side of the second electrode in the third direction with respect to the cut portion.

The first power connector may include a first contact area extending in the third direction that is orthogonal to the first direction and the second direction, the first contact area being in contact with a first power supply configured to supply power to the first electrode, and a first connection area extending in the second direction and to electrically connect the first connection area to the first electrode.

The second power connector may include a second contact area extending in the third direction and being in contact with a second power supply configured to supply power to the second electrode, and a second connection area extending in the second direction and to electrically connect the second connection area to the second electrode.

The third power connector may include a third contact area extending in the third direction and being in contact with a third power supply configured to supply power to the second electrode, and a third connection area extending in the second direction and to electrically connect the third connection area to the second electrode.

The second connection area may be connected to one side of the second electrode in the third direction that is orthogonal to the first direction and the second direction with respect to the cut portion.

The second contact area may extend in the third direction along an entire of another end of the dust collecting sheet in the second direction.

The third connection area may be connected to another side of the second electrode in the third direction that is orthogonal to the first direction and the second direction with respect to the cut portion.

At least one portion of the third contact area may extend in the third direction in an inner side of the dust collecting sheet in the second direction.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
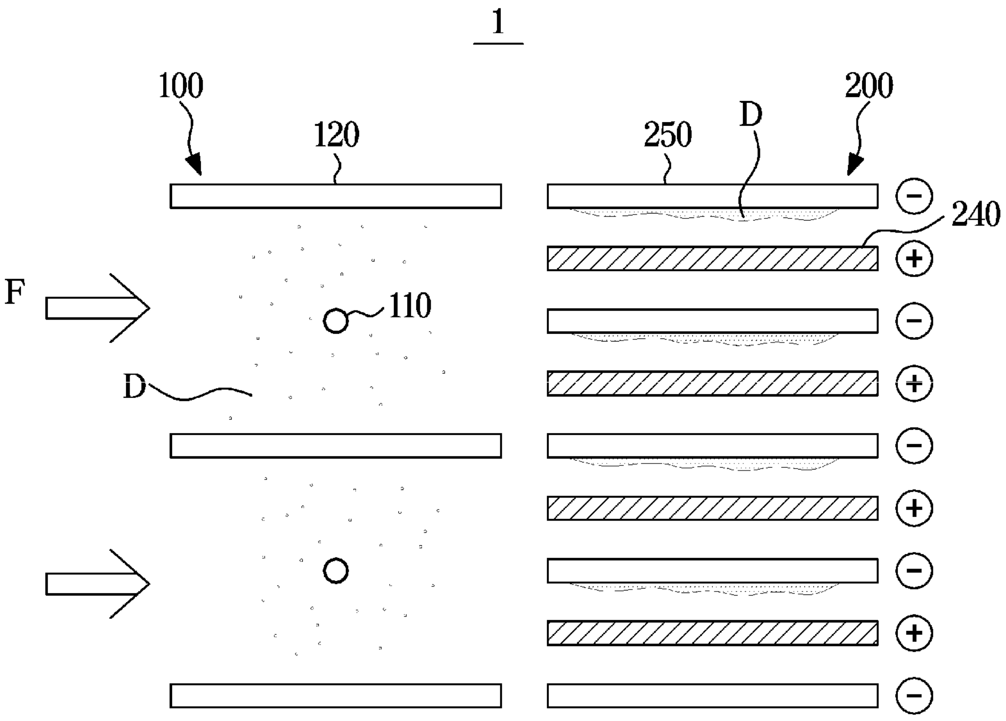
FIG. 1 is a conceptual diagram of an electrostatic precipitator according to an embodiment of the disclosure.

Configurations illustrated in the drawings and the embodiments described in the present specification are only the preferred embodiments of the present disclosure, and thus it is to be understood that various modified examples, which may replace the embodiments and the drawings described in the present specification, are possible when filing the present application.

Also, like reference numerals or symbols denoted in the drawings of the present specification represent members or components that perform the substantially same functions.

Also, the terms used in the present specification are merely used to describe the embodiments, and are not intended to limit and/or restrict the disclosure. It is to be understood that the singular forms "a," "an," and "the" include plural referents unless the context clearly dictates otherwise. It will be understood that when the terms "includes," "comprises," "including," and/or "comprising," when used in this specification, specify the presence of stated features, figures, steps, operations, components, members, or combinations thereof, but do not preclude the presence or addition of one or more other features, figures, steps, operations, components, members, or combinations thereof.

Also, it will be understood that, although the terms including ordinal numbers, such as "first", "second", etc., may be used herein to describe various components, these components should not be limited by these terms. These terms are only used to distinguish one component from another. For example, a first component could be termed a second component, and, similarly, a second component could be termed a first component, without departing from the scope of the present disclosure. As used herein, the term "and/or" includes any and all combinations of one or more of associated listed items.

Meanwhile, in the following description, the terms "front", "rear", "left", "right", etc. are defined based on the drawings, and the shapes and positions of the components are not limited by the terms.

Throughout the disclosure, the expression "at least one of a, b or c" indicates only a, only b, only c, both a and b, both a and c, both b and c, all of a, b, and c, or variations thereof.

Also, in the following description, a positive electrode and a negative electrode are named based on a potential difference between the two electrodes, wherein a high level of potential is referred to as a positive electrode and a low level of potential is referred to as a negative electrode.

Therefore, it is an aspect of the disclosure to provide an electrostatic precipitator capable of collecting foreign materials on electrodes through electricity and sterilizing the electrodes.

It is an aspect of the disclosure to provide an electrostatic precipitator in which power connectors connected to a plurality of electrodes are arranged to be spaced apart from each other with preset distances.

It is an aspect of the disclosure to provide an electrostatic precipitator capable of improving ease of production and productivity by integrating a plurality of electrodes configuring a dust collecting unit into one body on a dust collecting sheet and efficiently connecting power supplies for dust collection and sterilization to the respective electrodes, and a method for manufacturing the dust collecting unit.

Technical objects of the disclosure are not limited to those described above, and other technical objects not described herein will also be clearly understood by a person who has a common knowledge in the technical field to which the disclosure pertains from the following detailed description.

Hereinafter, an embodiment of the disclosure will be described in detail with reference to the accompanying drawings.

Figure 2:
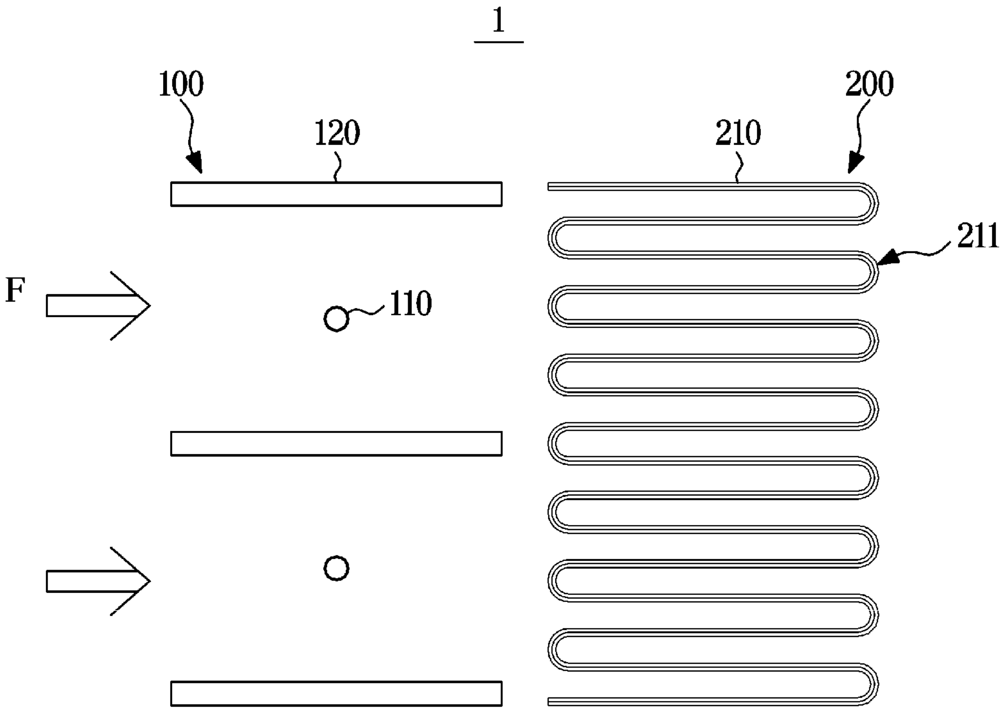
FIG. 2 schematically shows an electrostatic precipitator according to an embodiment of the disclosure.

FIG. 1 is a conceptual diagram of an electrostatic precipitator according to an embodiment of the disclosure, and FIG. 2 schematically shows an electrostatic precipitator according to an embodiment of the disclosure.

Referring to FIGS. 1 and 2, an electrostatic precipitator 1 according to an embodiment of the disclosure may include a charging unit 100 and a dust collecting unit 200.

The electrostatic precipitator 1 may be positioned inside a housing (not shown), wherein outside air entered the charging unit 100 by a blow fan (not shown) provided at upstream or downstream of the electrostatic precipitator 1 may pass through the dust collecting unit 200 and then be again discharged to outside. The electrostatic precipitator 1 according to an embodiment of the disclosure may be implemented as an air cleaner or an air conditioner having an air cleaning function, or the electrostatic precipitator 1 may be positioned inside an air conditioner.

The charging unit 100 may be a component for charging contaminants such as dust in air, and include a plurality of discharge electrodes 110 and a plurality of corresponding electrodes 120. Each discharge electrode 110 may be positioned between a pair of corresponding electrodes 120. Accordingly, upon application of a preset voltage to the discharge electrodes 110 and the corresponding electrodes 120, corona discharge may occur between a discharge electrode 110 and a pair of corresponding electrodes 120, and the corona discharge may charge contaminants passing through the charging unit 100.

Each discharge electrode 110 may be a wire electrode. For example, each discharge electrode 110 may use a tungsten wire. Each corresponding electrode 120 may be formed in a shape of a flat plate and formed as a conductive metal plate. For example, each corresponding electrode 120 may be formed as an aluminum plate.

The above-described charging unit 100 may have, representatively, a wire-plate structure that uses high-voltage discharge. However, the charging unit 100 may include various devices for charging contaminants to a preset polarity, in addition to discharge using carbon brush electrodes or needle-shaped electrodes.

The dust collecting unit 200 may collect dust charged in the charging unit 100, and include a dust collecting sheet 210 resulting from regularly bending a piece of sheet.

The dust collecting sheet 210 may include a plurality of bending portions 211 formed by regularly bending a single dust collecting sheet 210 in zigzags. For example, as shown in FIG. 2, the dust collecting sheet 210 may be in a shape of a rectangle of which a vertical length is longer than a horizontal width being a direction in which air enters in an unfolded state in FIG. 2, and by regularly bending the dust collecting sheet 210 in zigzags along a vertical direction in FIG. 2, the plurality of bending portions 2100 may be formed, although not limited thereto. However, the horizontal length of the dust collecting sheet 210 may be longer than the vertical length, and also, the dust collecting sheet 210 may include a plurality of bending portions formed by regularly bending the dust collecting sheet 210 in zigzags along the horizontal direction according to a shape of the electrostatic precipitator 1 including the dust collecting unit 200.

The dust collecting unit 200 may be configured such that a plurality of bending portions 211 are positioned between a pair of corresponding electrodes 120 of the charging unit 100. For example, the dust collecting unit 200 may be configured such that 10 bending portions 211 are positioned between a pair of corresponding electrodes 120. Thereby, charged contaminants entered the dust collecting unit 200 may be effectively adsorbed on the dust collecting unit 200. Details about components of the dust collecting unit 200 will be described below.

Figure 3:
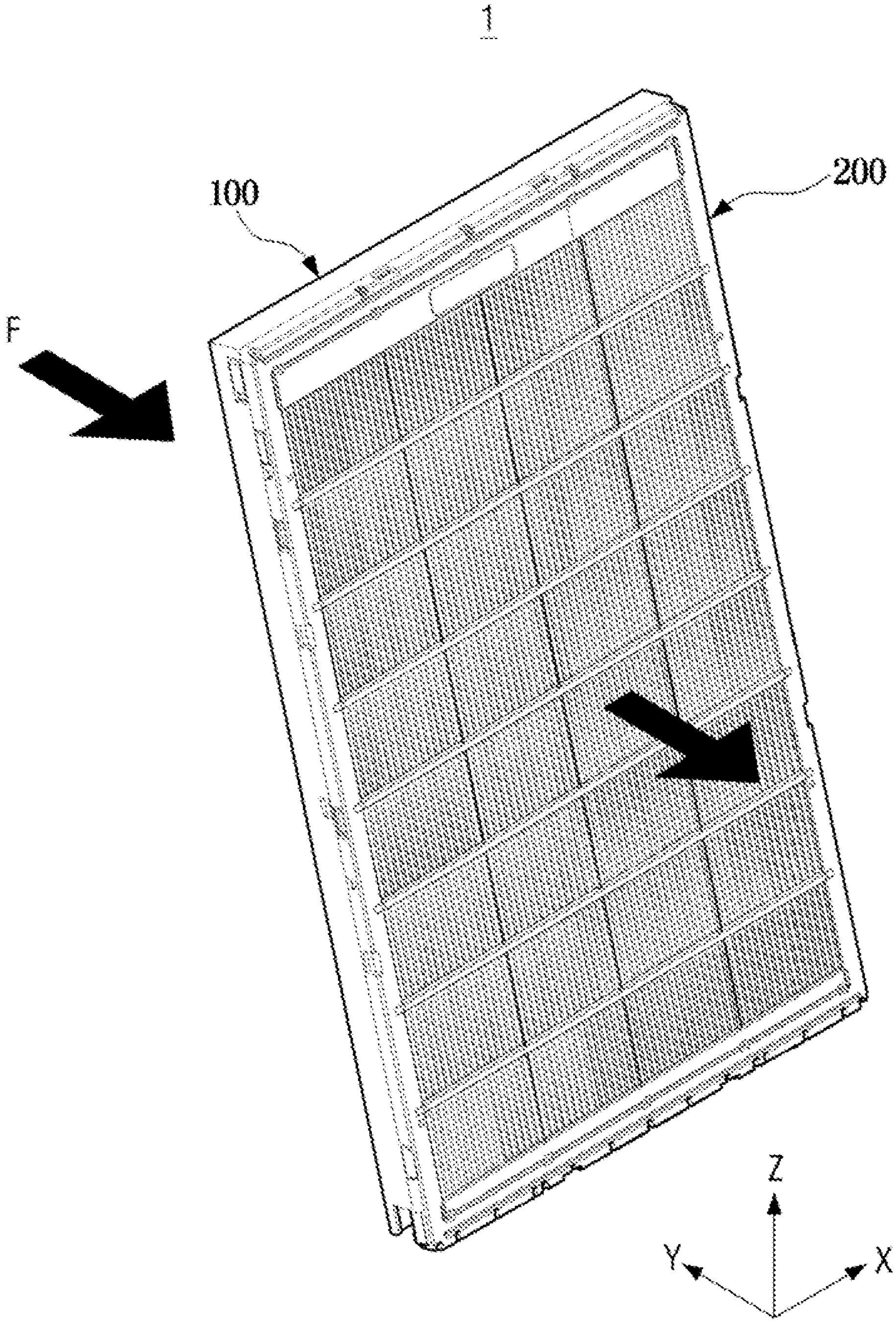
FIG. 3 is a perspective view showing an electrostatic precipitator according to an embodiment of the disclosure.
Figure 4:
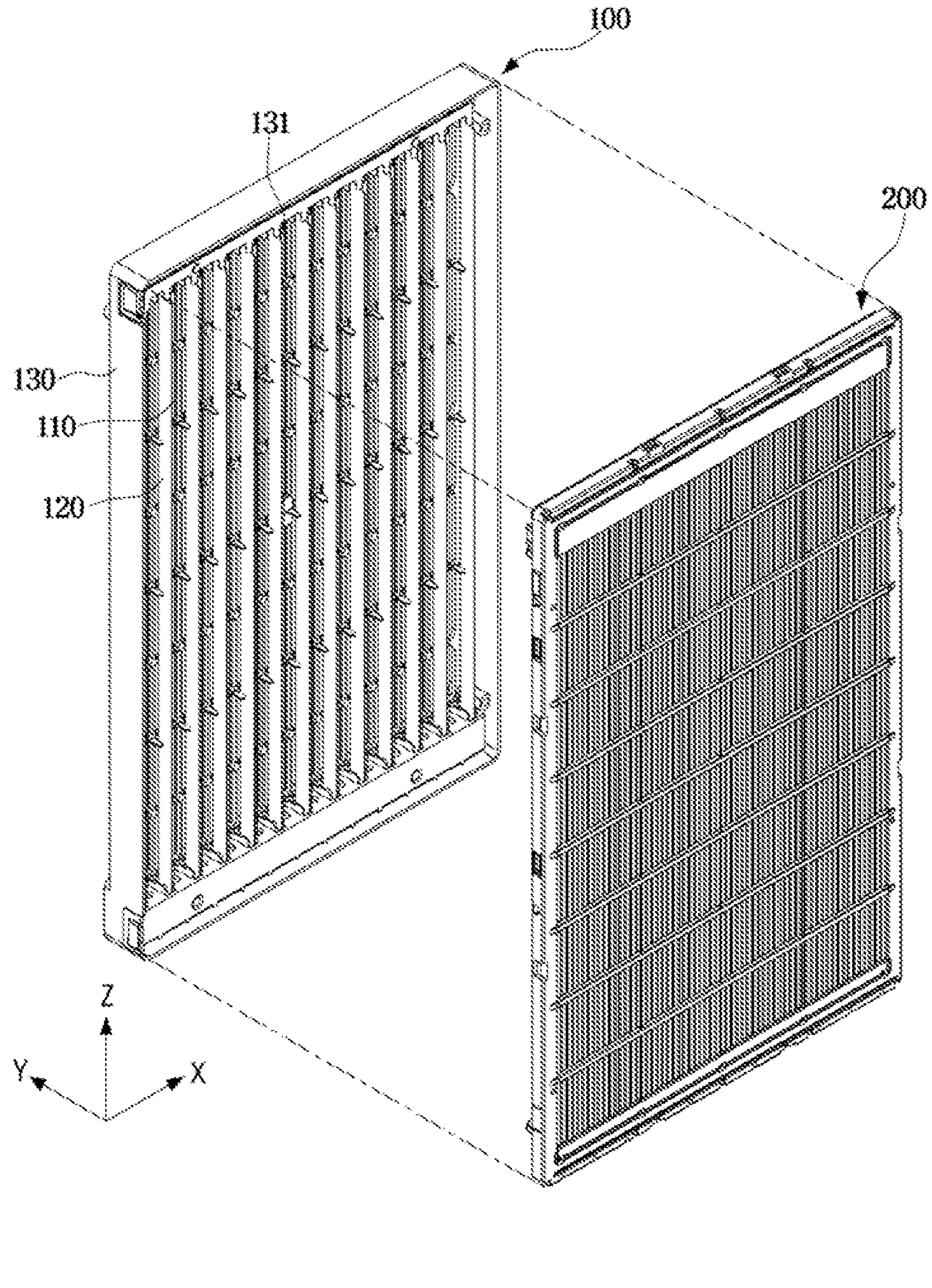
FIG. 4 is an exploded perspective view of the electrostatic precipitator shown in FIG. 3.

FIG. 3 is a perspective view showing an electrostatic precipitator according to an embodiment of the disclosure, and FIG. 4 is an exploded perspective view of the electrostatic precipitator shown in FIG. 3.

As shown in FIGS. 3 and 4, the electrostatic precipitator 1 may include the charging unit 100 and the dust collecting unit 200 coupled to the charging unit 100 in such way as to face the charging unit 100. Accordingly, while outside air passes through the charging unit 100 and the dust collecting unit 200 sequentially in a F direction shown in FIG. 3, contaminants of the outside air may be removed.

As described above, the charging unit 100 may include the plurality of discharge electrodes 110 and the plurality of corresponding electrodes 120 respectively positioned between the plurality of discharge electrodes 110, and also, the charging unit 100 may include a charging cover 130 supporting the plurality of discharge electrodes 110 and the plurality of corresponding electrodes 120.

As shown in FIG. 4, the plurality of discharge electrodes 110 and the plurality of corresponding electrodes 120 may extend along a longitudinal direction (Z direction of FIG. 4) of the charging cover 130 on an inner side of the charging cover 130, and the plurality of discharge electrodes 110 and the plurality of corresponding electrodes 120 may be arranged alternately in parallel along a width direction (X direction of FIG. 4) of the charging cover 130.

The plurality of discharge electrodes 110 may be wires made of a metal material, for example, tungsten wires, and the plurality of corresponding electrodes 120 may be plates made of a metal material such as aluminum and extending along a longitudinal direction of the plurality of discharge electrodes 110.

According to application of a high voltage to the discharge electrodes 110, contaminants included in air may be charged to a positive (+) polarity or a negative (−) polarity through corona discharge of the discharge electrodes 110 and the corresponding electrodes 120. Hereinafter, for convenience of description, an example in which power of a positive polarity is applied to the discharge electrodes 110 to charge contaminants in air passing through the charging unit 100 to a positive polarity will be described.

The charging cover 130 may be in a shape of a frame that fixes both ends of the plurality of discharge electrodes 110 and the plurality of corresponding electrodes 120, and the charging cover 130 may include a plurality of intakes 131 formed in a shape of a lattice in an inner portion. Accordingly, outside air may be received through the plurality of intakes 131 of the charging cover 130, and contaminants included in the received air may be charged through corona discharge between the plurality of discharge electrodes 110 and the plurality of corresponding electrodes 120 to move to the dust collecting unit 200 positioned at downstream of the charging unit 100.

However, because the above-described charging unit 100 is the same as or similar to an existing technique, further detailed descriptions thereof will be omitted.

Figure 5:
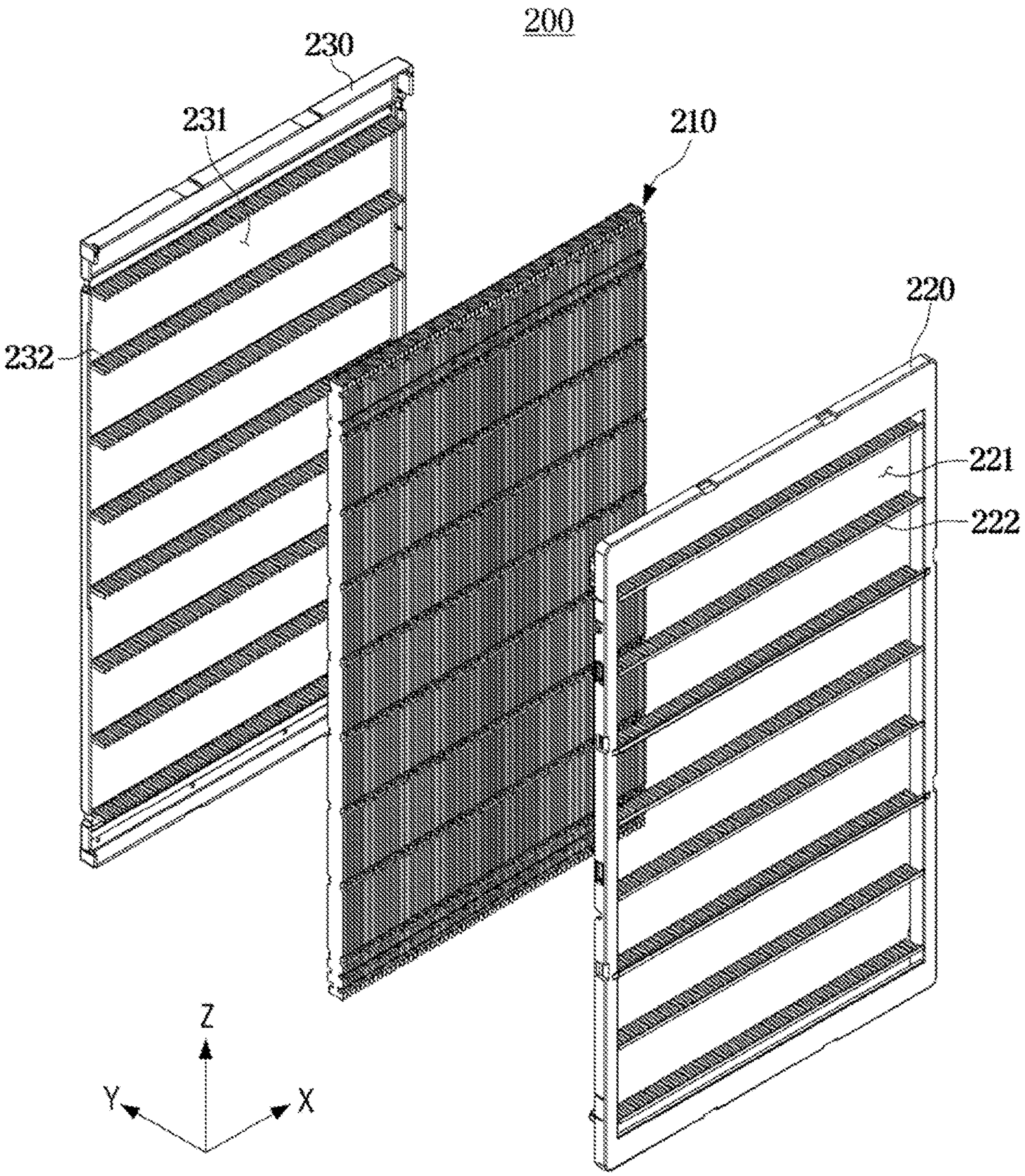
FIG. 5 is an exploded perspective view of a dust collecting unit shown in FIG. 4.

FIG. 5 is an exploded perspective view of the dust collecting unit 200 shown in FIG. 4.

Referring to FIG. 5, the dust collecting unit 200 may include the dust collecting sheet 210 in which the plurality of bending portions 211 are formed, and first and second covers 220 and 230 covering the dust collecting sheet 210.

Each of the first and second covers 220 and 230 may be in a shape of a frame surrounding edges of the dust collecting sheet 210, and air passed through the charging unit 100 may pass through the dust collecting sheet 210 via openings 221 and 231 formed in inner portions of the first and second covers 220 and 230.

As described above, because the dust collecting sheet 210 is configured as a shape resulting from bending a single dust collecting sheet 210 in zigzags to have the plurality of bending portions 211, a plurality of support members 222 and 232 supporting the dust collecting sheet 210 may be further included in the inner portions of the first and second covers 220 and 230.

The plurality of support members 222 and 232 may be arranged at regular intervals in the openings 221 and 231 of the first and second covers 220 and 230 to stably support the dust collecting sheet 210.

In addition, a power connecting member (not shown) may be positioned on the first and second covers 220 and 230, and the power connecting member may be connected to the dust collecting sheet 210 to apply power to the dust collecting sheet 210.

Figure 6:
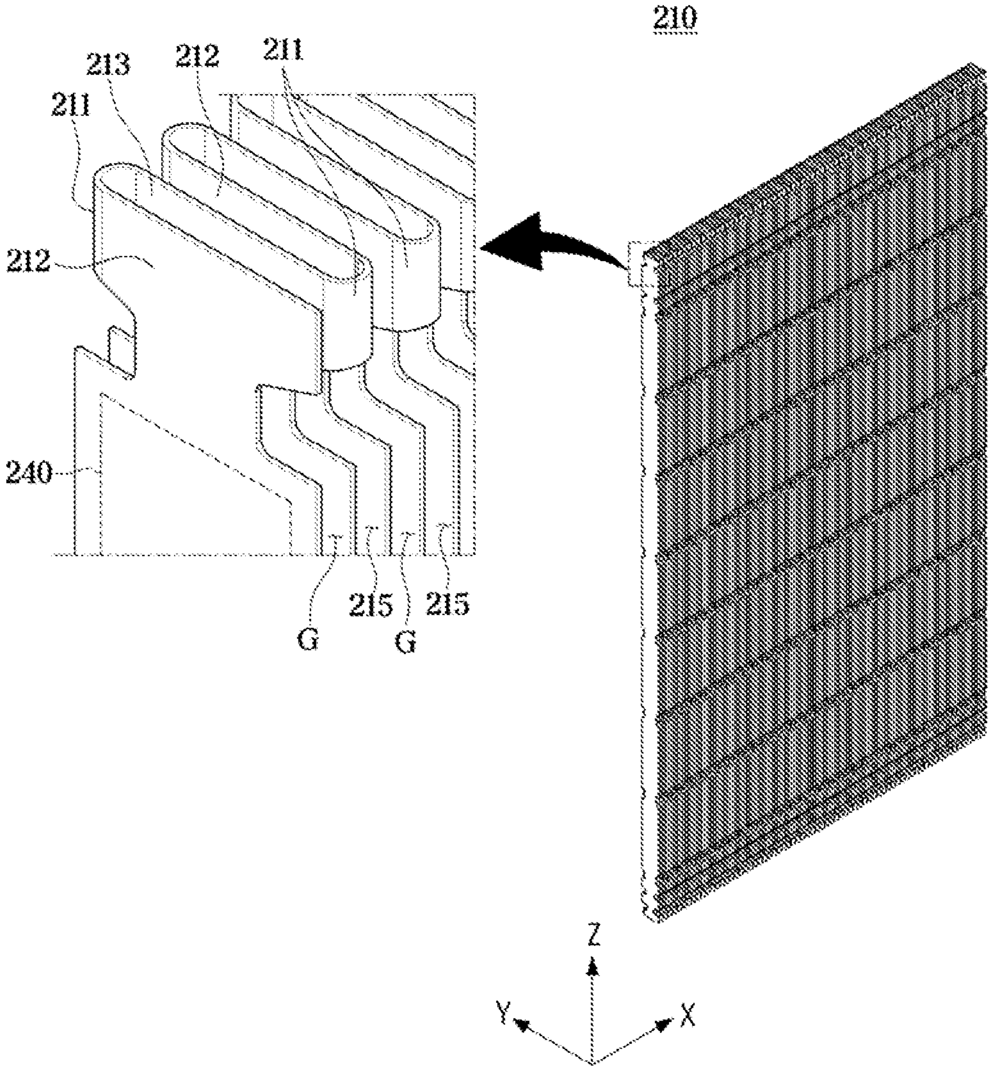
FIG. 6 is an enlarged perspective view showing a portion of a dust collecting sheet shown in FIG. 5.
Figure 7:
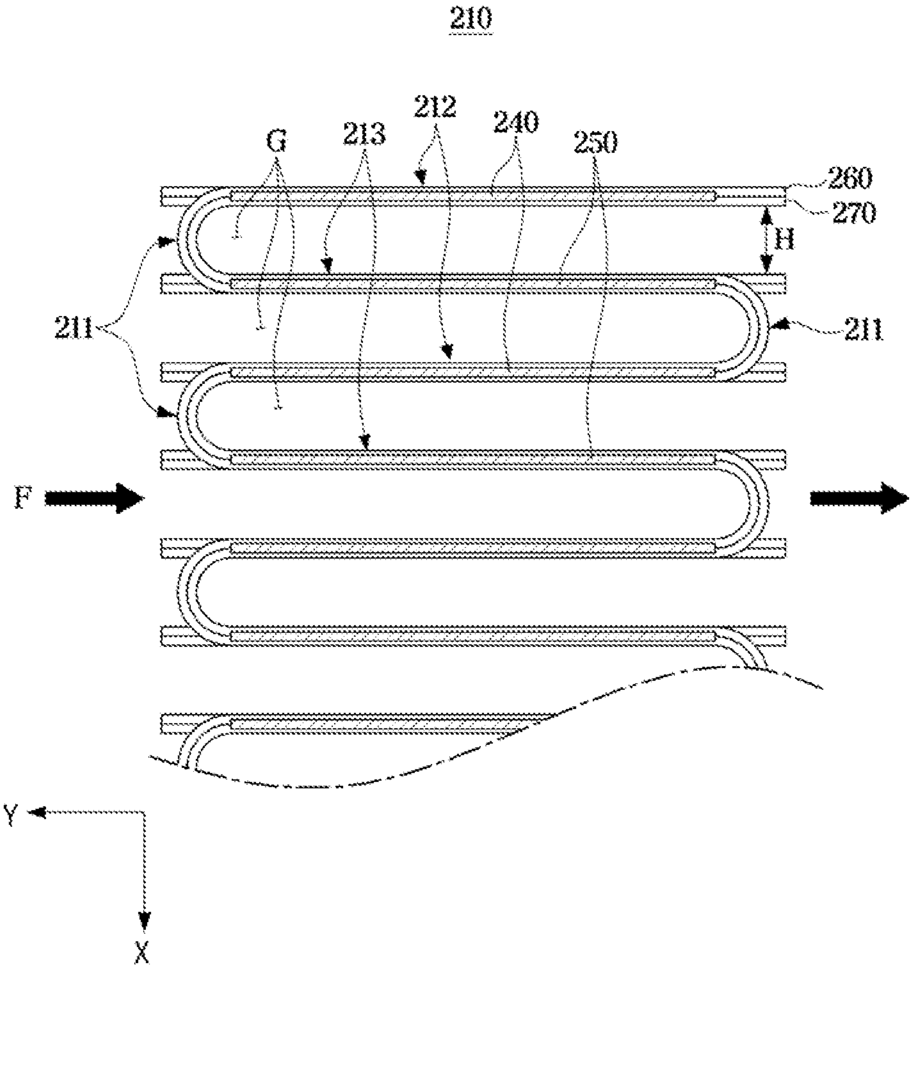
FIG. 7 is a side cross-sectional view of the dust collecting sheet shown in FIG. 6.

FIG. 6 is an enlarged perspective view showing a portion of the dust collecting sheet shown in FIG. 5, and FIG. 7 is a side cross-sectional view of the dust collecting sheet shown in FIG. 6.

Hereinafter, components of the dust collecting sheet 210 bent in zigzags will be described in detail with reference to FIGS. 6 and 7. The dust collecting sheet 210 shown in FIG. 6 shows an example of bending the dust collecting sheet 210 being in a shape of a rectangle of which a horizontal length is longer than a vertical length before bending, in zigzags along the horizontal direction, to form the plurality of bending portions 210. However, a shape of the dust collecting sheet 210 before bending may change according to a shape of the electrostatic precipitator 1, and a bending direction of the dust collecting sheet 210 being in an unfolded state before bending may also change variously, as described above.

Also, FIG. 7 shows a side cross-sectional view of the dust collecting sheet 210 resulting from rotating the dust collecting sheet 210 shown in FIG. 6 by 90 degrees, for convenience of description. A horizontal direction, a vertical direction, a width direction or a longitudinal direction of the dust collecting sheet 210 which will be described below is a relative concept that is defined according to a direction of view, and the horizontal direction, the vertical direction, the width direction or the longitudinal direction of the dust collecting sheet 210 may change variously according to criterion.

However, for convenience of description, hereinafter, a direction along which a first electrode 240 overlaps with a second electrode 250 may be defined as a first direction X, a longitudinal direction of the first electrode 240 and the second electrode 250 may be defined as a second direction Z, and a direction that is orthogonal to the first direction X and the second direction Z and is a width direction of the first electrode 240 and the second electrode 250 may be defined as a third direction Y.

As shown in FIG. 7, the dust collecting sheet 210 may include a plurality of first electrodes 240 and a plurality of second electrodes 250 that are alternately arranged, therein.

As described above, the dust collecting sheet 210 may form the plurality of bending portions 211 by bending a flat dust collecting sheet 210 configured with one piece of sheet in zigzags, and by laminating a second sheet (270 of FIG. 8) on one surface of a first sheet (260 of FIG. 8) on which the plurality of first electrodes 240 and the plurality of second electrodes 250 are arranged, a single dust collecting sheet 210 may be configured. Components of the dust collecting sheet 210 including the first and second sheets 260 and 270 will be described below.

The plurality of bending portions 211 may be formed by bending the dust collecting sheet 210 in zigzags such that the plurality of first electrodes 240 face the plurality of second electrodes 250.

More specifically, the dust collecting sheet 210 may include a plurality of flat surfaces 212 and 213 that face each other at regular intervals by bending, and each of the plurality of bending portions 211 may be positioned between two opposite flat surfaces 212 and 213 of the plurality of flat surfaces 212 and 213 to connect the two flat surfaces 212 and 213 to each other.

A pair of opposite flat surfaces 212 and 213 may be configured with a first flat surface 212 and a second flat surface 213. In the dust collecting sheet 210, a plurality of first flat surfaces 212 and a plurality of second flat surfaces 213 may be alternately and regularly arranged in parallel, and the bending portions 211 connecting the first flat surfaces 212 to the second flat surfaces 213 may be formed in zigzags in opposite directions according to zigzag-bending of the dust collecting sheet 210.

In addition, by positioning the first electrodes 240 on the first flat surfaces 212 and positioning the second electrodes 250 on the second flat surfaces 213, the plurality of first electrodes 240 and the plurality of second electrodes 250 that are alternately arranged in the dust collecting sheet 210 may face each other by the plurality of bending portions 211.

The plurality of first electrodes 240 and the plurality of second electrodes 250 that are alternately arranged in the dust collecting sheet 210 may be substantially in a shape of a rectangle of which a long side is positioned along the second direction Z.

As shown in FIGS. 6 and 7, the bending portions 211 may have curved shapes such that portions between the first flat surfaces 212 and the second flat surfaces 213 of the dust collecting sheet 210 form curved surfaces. Also, the bending portions 211 may be flat surfaces bent in a vertical direction from the first flat surfaces 212 and the second flat surfaces 213, or the bending portions 211 may be edges formed by folding the portions between the first flat surfaces 212 and the second flat surfaces 213 of the dust collecting sheet 210 in a straight line.

The plurality of bending portions 211 of the dust collecting sheet 210 may be respectively formed between the plurality of first electrodes 240 and the plurality of second electrodes 250. Accordingly, the plurality of bending portions 211 may be formed in zigzags along the first direction X between the plurality of first electrodes 240 and the plurality of second electrodes 250.

At one side of each bending portion 211, the first flat surface 212 including the first electrode 240 therein may be positioned, and at another side of the bending portion 211, the second flat surface 213 including the second electrode 250 therein may be positioned to face the first flat surface 212. Accordingly, the plurality of first electrodes 240 and the plurality of second electrodes 250 may be alternately stacked along the first direction X.

In addition, the first flat surface 212 including the first electrode 240 therein, the bending portion 211, and the second flat surface 213 including the second electrode 250 therein may be successively arranged to easily collect contaminants in air passing through the plurality of first flat surfaces 212 and the plurality of second flat surfaces 213.

The dust collecting sheet 210 may include a plurality of openings 215 respectively formed in the plurality of bending portions 211. Accordingly, the dust collecting sheet 210 may pass air passed through the charging unit 100 and received by one side through the plurality of openings 215.

As shown in FIGS. 6 and 7, the plurality of first flat surfaces 212 may face the plurality of second flat surfaces 213, wherein gaps G through which air passes may be formed between the plurality of first flat surfaces 212 and the plurality of second flat surfaces 213.

Accordingly, air passed through the charging unit 100 may enter the gaps G, and air passed through the gaps G may pass through the dust collecting sheet 210 via the openings 215 formed in the bending portions 211 corresponding to the gaps G.

In addition, because the plurality of bending portions 211 are formed in zigzags, air passed through the charging unit 100 may enter the openings 215 formed in the bending portions 211, and air entered the openings 215 may pass through the dust collecting sheet 210 via the corresponding gaps G.

As such, the dust collecting sheet 210 may pass air through the gaps G formed between the first flat surfaces 212 and the second flat surfaces 213 and the openings 215 formed in the bending portions 211.

By applying power of different polarities to the plurality of first electrodes 240 and the plurality of second electrodes 250 respectively positioned on inner sides of the plurality of first flat surfaces 212 and the plurality of second flat surfaces 213 that face each other, an electric field may be formed between the first electrodes 240 and the second electrodes 250.

More specifically, the plurality of first electrodes 240 may be configured with high-voltage electrodes, and the plurality of second electrodes 250 may be configured with low-voltage electrodes having a lower voltage than that of the first electrodes 240. For example, by applying power of a high voltage to the plurality of first electrodes 240 and grounding the plurality of second electrodes 250, a voltage difference may be formed between the first electrodes 240 and the second electrodes 250.

Also, by applying power of a positive polarity to the plurality of first electrodes 240 and applying power of a negative polarity to the plurality of second electrodes 250, an electric field may be formed between the first electrodes 240 and the second electrodes 250. Also, by applying a high voltage of a positive polarity to the first electrodes 240 and grounding the second electrodes 250, an electric field may be formed between the first electrodes 240 and the second electrodes 250.

Accordingly, contaminants charged to a positive polarity by passing through the charging unit 100 may be adsorbed on the second electrodes 250 being negative electrodes, that is, the second flat surfaces 213 including the second electrodes 250 therein, while passing through the gaps G between the first flat surfaces 212 and the second flat surfaces 213 (see FIG. 1).

In addition, while contaminants passed through the charging unit 100 are charged to a negative polarity by applying a high voltage of a negative polarity to the discharge electrodes 110, the contaminants may be adsorbed on the second flat surfaces 213 including the plurality of second electrodes 250 as positive electrodes therein by applying a high voltage of a negative polarity to the plurality of first electrodes 240 of the dust collecting unit 200.

As such, while air including the charged contaminants passes through the plurality of gaps G formed by bending the dust collecting sheet 21 in zigzags, the contaminants may be adsorbed on the plurality of second electrodes 250, and thereby, the air may be purified.

Also, the dust collecting sheet 210 may further include a space maintaining member (not shown) for maintaining a constant height (or size) H of the gap G by maintaining a constant interval between the first flat surface 212 and the second flat surface 213.

The space maintaining member may be positioned between the first flat surface 212 and the second flat surface 213 to support the first flat surface 212 and the second flat surface 213 at a constant interval, and by changing a height of the space maintaining member, the height H of the gap G corresponding to the height of the space maintaining member may be set.

More specifically, the space maintaining member may be formed as a heat-melting adhesive such as hot melt on the dust collecting sheet 210 with a preset width and a preset height, or the space maintaining member may be formed by attaching a double-sided adhesive having a preset width and a preset height on the dust collecting sheet 210.

For example, the space maintaining member may be unremittedly applied on one side of the dust collecting sheet 210 being in an unfolded state before the dust collecting sheet 210 is bent, and while the dust collecting sheet 210 is bent in zigzags to form the bending portions 211, a height of the space maintaining member may be set such that a sum of heights of two space maintaining members being in contact with each other is equal to a preset height H of the gap G.

That is, by forming the space maintaining member having a height which is half the height H of the gap G on an upper surface of the dust collecting sheet 210 being in an unfolded state, the height H of the gap G formed between the first flat surface 212 and the second flat surface 213 may be maintained constant at a desired interval because the first flat surface 212 and the second flat surface 213 facing each other are supported by the space maintaining member upon bending of the dust collecting sheet 210.

Also, the space maintaining member may be formed of a conductive material having elasticity, instead of hot melt described above, or the space maintaining member may be configured in a shape of a dot or column positioned between the first flat surface 212 and the second flat surface 213.

However, the space maintaining member may be formed with a uniform, narrow width as possible neither to obstruct a flow of air passing through the gap G nor disrupt formation of an electric field between the first electrode 240 and the second electrode 250.

Figure 8:
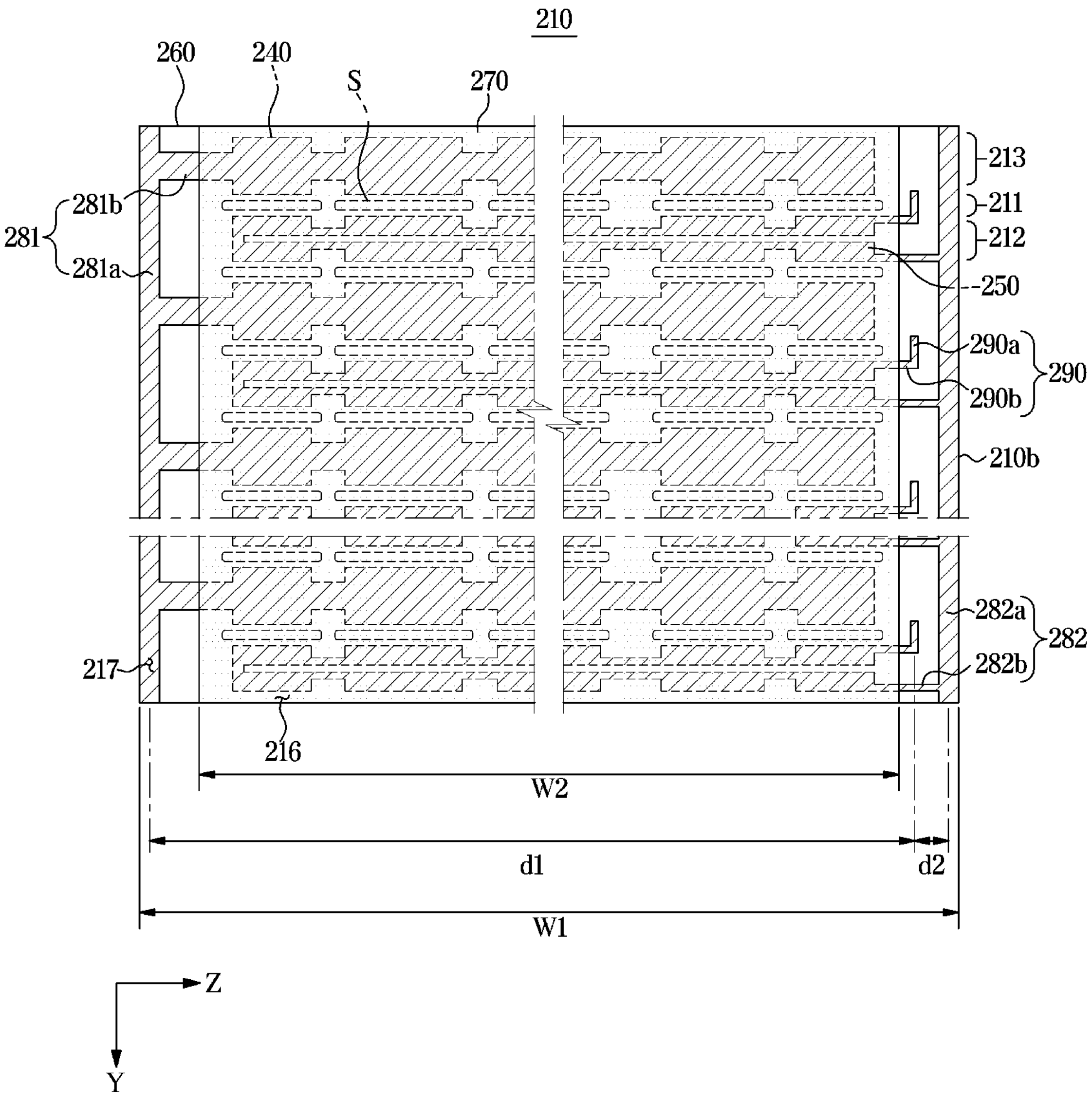
FIG. 8 is a top planar view showing the dust collecting sheet shown in FIG. 7 before the dust collecting sheet is bent.

The dust collecting sheet 210 shown in FIGS. 6 and 7 may be formed by first manufacturing a dust collecting sheet 210 being in an unfolded state, as shown in FIG. 8, and then bending the dust collecting sheet 210 in zigzags.

Hereinafter, a structure of the dust collecting sheet 210 including the first and second sheets 250 and 260 will be described with reference to FIGS. 8 and 9.

Figure 9:
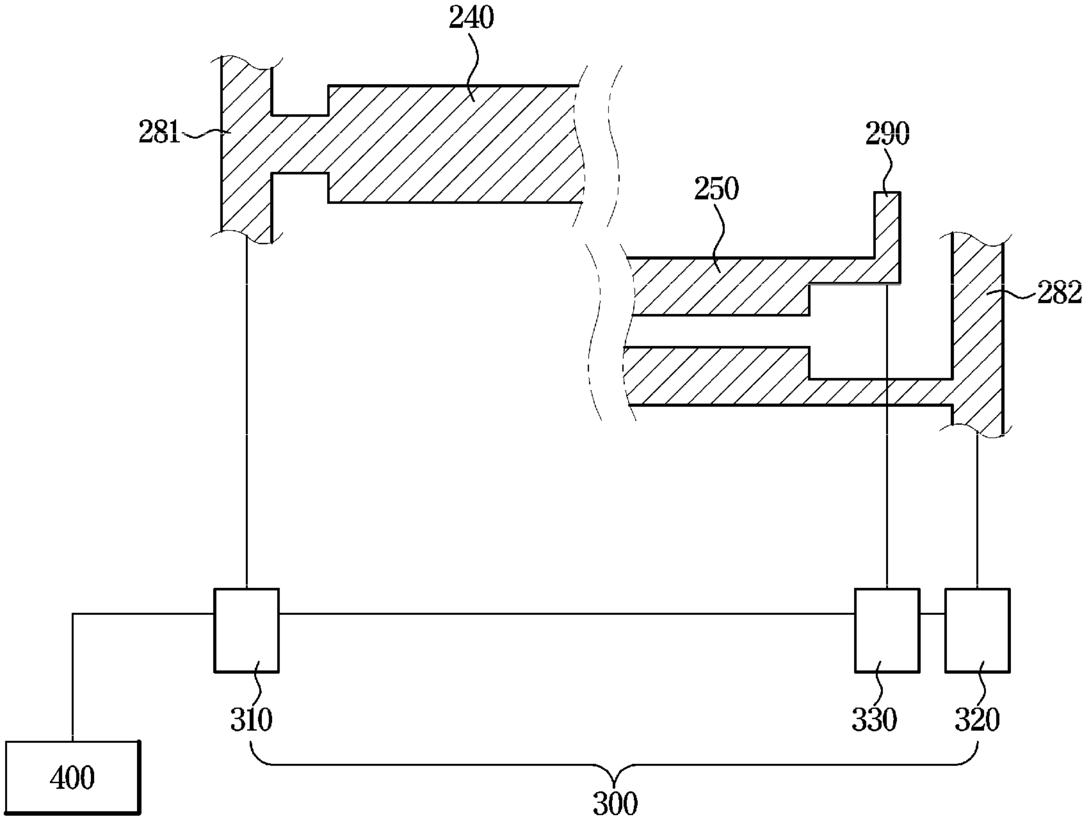
FIG. 9 schematically shows some components of an electrostatic precipitator according to an embodiment of the disclosure.
Figure 10:
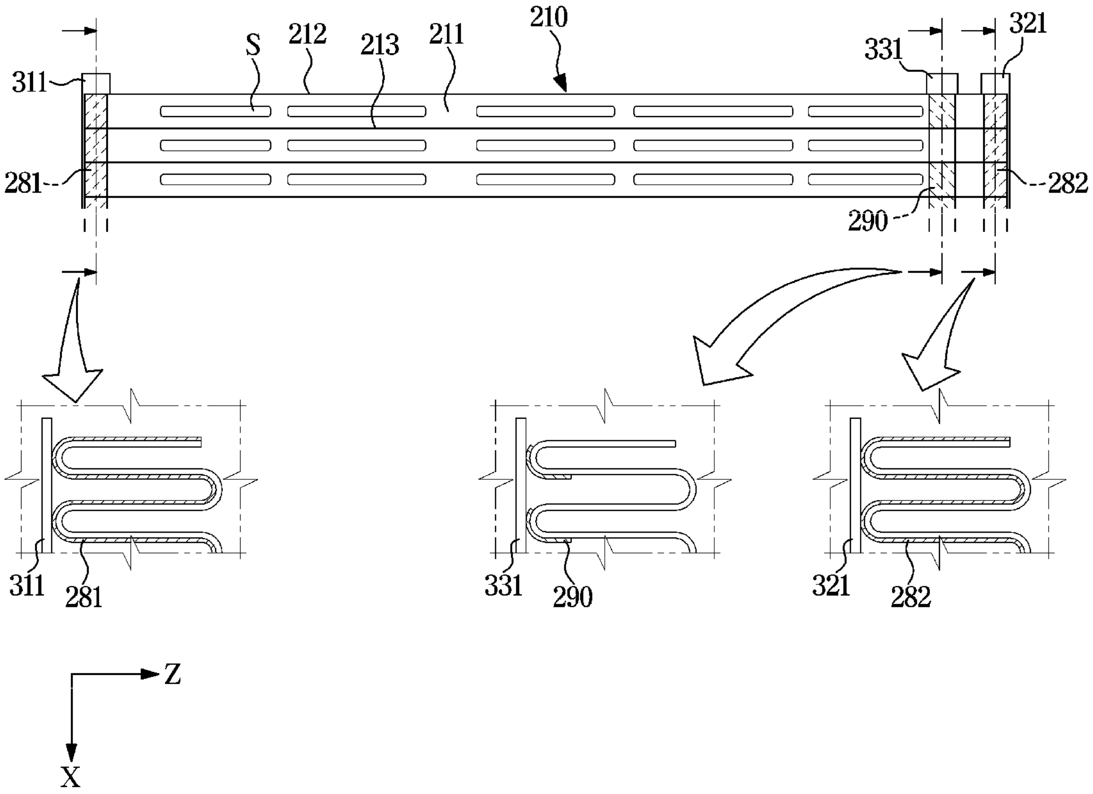
FIG. 10 shows connections between a dust collecting sheet of an electrostatic precipitator according to an embodiment of the disclosure and a power supply.

FIG. 8 is a top planar view showing the dust collecting sheet shown in FIG. 7 before the dust collecting sheet is bent, and FIG. 9 schematically shows some components of an electrostatic precipitator according to an embodiment of the disclosure.

A top view of the dust collecting sheet 210 shown in FIG. 8 is obtained by rotating the dust collecting sheet 210 shown in FIG. 6 by 90 degrees and unfolding the dust collecting sheet 210, and, as described above, the horizontal direction, the vertical direction, the width direction, or the longitudinal direction of the dust collecting sheet 210 is a relative concept that is defined according to a direction of view. The following descriptions will be given based on the first direction X, the second direction Z, and the third direction Y.

The dust collecting sheet 210 may include the first sheet 260 and the second sheet 270 laminated on the first sheet 260, and accordingly, the first and second sheets 260 and 270 may be integrated into one sheet to configure the dust collecting sheet 210.

More specifically, the plurality of first electrodes 240 and the plurality of second electrodes 250 may be alternately arranged on one surface of the first sheet 260, and the second sheet 270 may be coupled to the one surface of the first sheet 260 on which the plurality of first electrodes 240 and the plurality of second electrodes 250 are arranged. Accordingly, the plurality of first electrodes 240 and the plurality of second electrodes 250 may be arranged between the first sheet 260 and the second sheet 270. The second sheet 260 may be laminated on the second sheet 270 by an adhesive.

The first sheet 260 may be in a shape of a film made of a polyethylene terephthalate (PET) material, although not limited thereto.

The second sheet 270 may be in a shape of a film made of an ethylene vinyl acetate (EVA) material, although not limited thereto.

The plurality of first and second electrodes 240 and 250 may be alternately arranged at regular intervals on one surface of the first sheet 260. The plurality of first and second electrodes 240 and 250 may be printed on one surface of the first sheet 260 or configured as a deposited conductive pattern, or the plurality of first and second electrodes 240 and 250 may be printed with a conductive carbon ink on one surface of the first sheet 260, although not limited thereto.

However, the first and second electrodes 240 and 250 may be provided as a carbon film or a conductive metal such as aluminum, and may be formed by being deposited on the first sheet 260.

In addition, a first power connector 281 connected to the plurality of first electrodes 240 to apply power to the plurality of first electrodes 240 and a second power connector 282 connected to the plurality of second electrodes 250 to apply power to the plurality of second electrodes 250 may be positioned on one surface of the first sheet 260.

The first and second connectors 281 and 282 may be printed on one surface of the first sheet 260 or configured as a deposited conductive pattern by the same method by which the plurality of first and second electrodes 240 and 250 are formed.

The first and second power connectors 281 and 282 may be exposed to outside of the dust collecting sheet 210 to receive power from the outside. For this, a width W1 of the first sheet 260 may be greater than a with W2 of the second sheet 270, the first power connector 281 may be positioned at one side end of the first sheet 260 in the second direction Z, and the second power connector 282 may be positioned at another side end of the first sheet 260 in the second direction Z.

In addition, the second sheet 270 may be coupled to a center portion of one surface of the first sheet 260 such that the first and second power connectors 281 and 282 are exposed to the outside on the first sheet 260, and the plurality of first electrodes 240 and the plurality of second electrodes 250 respectively connected to the first and second power connectors 281 and 282 may be positioned between the first sheet 260 and the second sheet 270.

Also, by applying external power of a high voltage to the first power connector 281, the plurality of first electrodes 240 may be configured as high-voltage electrodes, and by grounding the second power connector 282, the plurality of second electrodes 250 may be configured as low-voltage electrodes.

In addition, a third power connector 290 connected to the second electrodes 250 to apply power to the second electrodes 250 may be positioned on the first sheet 260 to heat the second electrodes 250.

Accordingly, additional power may be applied to the second electrodes 250 to heat the second electrodes 250 and sterilize foreign materials collected on the second electrodes 250. This will be described in detail, below.

The dust collecting sheet 210 may include a plurality of slits S respectively formed between the plurality of first electrodes 240 and the plurality of second electrodes 250.

As shown in FIG. 8, the plurality of slits S may be cutouts penetrating the dust collecting sheet 210, and the plurality of slits S may be respectively formed in the plurality of bending portions 211 and open by bending of the dust collecting sheet 210 to form the plurality of openings 215 through which air passes. Also, the plurality of slits S may be holes occupying certain areas in the dust collecting sheet 210 being in an unfolded state.

Because the dust collecting sheet 210 is bent between the plurality of first electrodes 240 and the plurality of second electrodes 250 to configure the plurality of bending portions 211, the plurality of slits S may be formed at center portions between the first electrodes 240 and the second electrodes 250 in the dust collecting sheet 210.

As described above, by bending the dust collecting sheet 210 in zigzags with respect to the center portions between the plurality of first electrodes 240 and the plurality of second electrodes 250, the plurality of bending portions 211 may be formed such that the first electrodes 240 face the second electrodes 250.

In addition, by forming the plurality of slits S in parallel to the first and second electrodes 240 and 250 along the second direction Z, the plurality of slits S may be formed at center portions of the bending portions 211, and accordingly, the openings 215 may be formed at the center portions of the bending portions 211.

As shown in FIG. 8, the bending portions 211 may be defined between one side edges of the first electrodes 240 and one side edges of the second electrodes 250 neighboring the first electrodes 240, and by bending the dust collecting sheet 210 with respect to the slits S formed at the center portions between the first electrodes 240 and the second electrodes 250, the first flat surfaces 212, the bending portions 211, and the second flat surfaces 213 may be defined.

As described above, by applying different voltages to the first electrodes 240 and the second electrodes 250, a potential difference may occur, and accordingly, foreign materials charged by passing through the charging unit 100 may be collected on the second electrodes 250 or the second flat surfaces 213 (see FIG. 1).

In an existing technique, while a state in which particles such as charged foreign materials are collected on electrodes corresponding to the second electrodes 250 is maintained, bacteria, virus, allergy materials, etc. collected on the surfaces of the electrodes may be maintained or grown. Because a part of the particles collected on the surfaces of the electrodes may be again desorbed or scattered in some cases and accordingly, bio aerosols, such as bacteria, virus, etc., may spread to an indoor space. Therefore, collection areas corresponding to the second electrodes 250 may need to be sterilized.

To resolve this, an electrostatic precipitator capable of performing sterilization by using ultraviolet (UV) and plasma discharge has been disclosed. However, there is a risk of generating harmful by-products such as ozone.

Also, in a sterilization method using a heating element, no harmful materials are generated compared to discharge through UV or the like. However, the method has high power consumption in the case of heating and sterilizing the entire of air passing through an electrostatic precipitator.

To resolve this, the electrostatic precipitator 1 according to an embodiment of the disclosure may sterilize the surfaces of the second electrodes 250 or the second flat surfaces 213 by heating the second electrodes 250 on which particles are collected, while maintaining a function of collecting charged particles by using an electric field.

By sterilizing particles through heating, the surfaces of the second electrodes 250 may be sterilized without generating any harmful by-products. Unlike sterilization through heating according to the existing technique of heating the entire of flowing air by heating the inside of the electrostatic precipitator 1, by heating only the second electrodes 250, energy consumed for heating may be reduced, resulting in an increase of efficiency of the electrostatic precipitator 1.

More specifically, as described above, the dust collecting sheet 210 may include the first electrodes 240, the second electrodes 250, and the first sheet 260 and the second sheet 270 on which the first and second electrodes 240 and 250 are arranged.

Also, the dust collecting sheet 210 may include the first power connector 281 electrically connected to the first electrodes 240 to collect charged particles on the second electrodes 250, and the second power connector 282 electrically connected to the second electrodes 250.

In addition, the dust collecting sheet 210 may include the third power connector 290 electrically connected to the second electrodes 250 to heat the second electrodes 250.

That is, by connecting the second electrodes 250 to both the second power connector 282 for generating an electric field together with the first electrodes 240 and the third power connector 290 for heating the second electrodes 250, the second electrodes 250 may collect foreign materials and heat and sterilize the collected foreign materials.

The first power connector 281 may be formed as a part of the first electrodes 240, although not limited thereto. However, the first power connector 281 may be provided by laminating a separate component from the first electrodes 240.

The first power connector 281 may be formed as a carbon film, etc., as described above, and deposited on the first sheet 270, or the first power connector 281 may be patterned with a carbon ink on the first sheet 270.

The first power connector 281 may include a first contact area 281*a* extending in the third direction Y while the dust collecting sheet 210 is in an unfolded state before being bent, the first contact area 281*a* being in contact with a power supply 300 which will be described below, and a first connection area 281*b* electrically connecting the plurality of first electrodes 240 to the first contact area 281*a*. Because the first contact area 281*a* extends in the third direction Y, the first contact area 281*a* may be electrically connected to all of the plurality of first electrodes 240.

The first contact area 281*a* may extend in the third direction Y along an entire of one end 210*a* of the dust collecting sheet 210 in the second direction Z.

The first connection area 281*b* may extend from the first contact area 281*a* to the first electrodes 240 along the second direction Z.

The second power connector 282 may be formed as a part of the second electrodes 250, although not limited thereto. However, the second power connector 282 may be provided by laminating a separate component from the second electrodes 250.

The second power connector 282 may be formed as a carbon film, etc., as described above, and deposited on the first sheet 270, or the second power connector 282 may be patterned with a carbon ink on the first sheet 270.

The second power connector 282 may include a second contact area 282*a* extending in the third direction Y while the dust collecting sheet 210 is in an unfolded state before being bent, the second contact area 282*a* being in contact with the power supply 300, and a second connection area 282*b* electrically connecting the plurality of second electrodes 250 to the second contact area 282*a*. Because the second contact area 282*a* extends in the third direction Y, the second contact area 282*a* may be electrically connected to all of the plurality of second electrodes 250.

The second contact areas 282*a* may extend in the third direction Y along an entire of another end 210*b* of the dust collecting sheet 210 in the second direction Z.

The second connection area 282*b* may extend from the second contact area 282*a* to the second electrodes 250 along the second direction Z.

The third power connector 290 may be formed as a carbon film, etc. and deposited on the second sheet 280, or the third power connector 290 may be patterned with a carbon ink on the second sheet 280.

The third power connector 290 may include a third contact area 290*a* extending in the third direction Y while the dust collecting sheet 210 is in an unfolded state before being bent, the third contact area 290*a* being in contact with the power supply 300, and a third connection area 290*b* electrically connecting the plurality of second electrodes 250 to the third contact area 290*a*.

At least one portion of the third contact area 290*a* may extend in the third direction Y at a location being adjacent to the other end 210*b* of the dust collecting sheet 210 in the second direction Z.

The third connection area 290*b* may extend along the second direction Z from the third contact area 290*a* to the second electrodes 250.

The third contact area 290*a* may extend in the third direction Y to be electrically connected to all of the plurality of second electrodes 250. As described above, for the first power connector 281, the second power connector 282, and the third power connector 290 to receive power from the outside, the width W1 of the first sheet 260 may be greater than the width W2 of the second sheet 270, and the second sheet 270 may be coupled to a center portion of one surface of the first sheet 260 such that the first power connector 281, the second power connector 282, and the third power connector 290 are exposed to the outside on the first sheet 260.

In this case, under an assumption that an area in which the first sheet 260 overlaps with the second sheet 270 in a direction in which the first electrodes 240 face the second electrodes 250 is a first area 216, and an area in which the first sheet 260 does not overlap with the second sheet 270 in the same direction, that is, an area outside the second sheet 270 is a second area 217 in the dust collecting sheet 210, the first power connector 281, the second power connector 282, and the third power connector 290 may be respectively positioned in the second area 217 and accordingly, the first power connector 281, the second power connector 282, and the third power connector 290 may be electrically easily connected to the power supply 300 which will be described below.

As shown in FIG. 9, the electrostatic precipitator 1 may include the power supply 300 for supplying power to the power connectors 281, 282, and 290.

The power supply 300 may include a first power supply 310 electrically connected to the first power connector 281, a second power supply 320 electrically connected to the second power supply 282, and a third power supply 330 electrically connected to the third power connector 290.

The power supplies 310, 320, and 330 may be connected to a first power source (not shown) for supplying power for dust collection of the electrostatic precipitator 1 and a second power source (not shown) for supplying power for heating the second electrodes 250 for sterilization of the electrostatic precipitator 1, through various circuits.

The power supplies 310, 320, and 330 may be electrically connected to the power connectors 281, 282, and 290 by various methods, such as driving the first and second power sources (not shown) and turning on/off switches on the circuits.

The first power supply 310 and the second power supply 320 may be electrically connected to the first power source (not shown), and the second power supply 320 may be grounded. Accordingly, a potential difference may occur between the first electrodes 240 and the second electrodes 250.

Also, the second power supply 320 and the third power supply 330 may be electrically connected to the second power source (not shown), and the second power supply 320 may be selectively electrically connected to the first power source (not shown) and the second power source (not shown) through various components such as a switch. Accordingly, power from the second power source (not shown) may be applied to the second electrodes 250 such that current flows through the second electrodes 250, and accordingly, the second electrodes 250 may be heated.

The electrostatic precipitator 1 may include a controller 400 for controlling the power supplies 310, 320, and 330.

The electrostatic precipitator 1 may be driven in any one mode of a dust collection mode and a sterilization mode by the controller 400.

The controller 400 may be electrically connected to the power supplies 310, 320, and 330 to turn on/off the power supplies 310, 320, and 330.

Upon driving of the electrostatic precipitator 1 in the dust collection mode, the controller 400 may control the first power supply 310 and the second power supply 320 to be driven.

According to application of power having a preset magnitude to the first power supply 310 and the second power supply 320 by the controller 400, foreign materials may be collected on the second electrodes 250.

While the electrostatic precipitator 1 is maintained in the dust collection mode, foreign materials may be continuously collected on the second flat surface 213 on which the second electrodes 250 are arranged, and harmful materials, such as bacteria, virus, and allergy materials, existing in the foreign materials may continuously exist or be grown.

Accordingly, the controller 400 may control, in a case in which a driving time of the dust collection mode elapses a preset time, the first power supply 310 and the second power supply 320 to be turned off, although not limited thereto.

However, the controller 400 may control, according to a command received from a user, the power supplies 310, 320, and 330 to terminate the dust collection mode of the electrostatic precipitator 1 and convert the dust collection mode to the sterilization mode.

Thereafter, the controller 400 may control the electrostatic precipitator 1 to be driven in the sterilization mode to sterilize foreign materials collected on the second electrodes 250.

More specifically, the controller 400 may control the second power supply 320 and the third power supply 330 to be driven.

The controller 400 may control the second power supply 320 and the third power supply 330 to apply appropriate power to the second electrodes 250 such that the second electrodes 250 are heated by power applied to the second electrodes 250.

The second electrodes 250 may be heated to generate heat from about 40 degrees to about 80 degrees. For this, the second electrodes 250 may be made of a material having high electrical resistance.

While the electrostatic precipitator 1 is maintained in the sterilization mode, the second electrodes 250 may be heated for a preset time, and accordingly, foreign materials collected on the second flat surface 213 may be completely sterilized.

In a case in which a driving time of the sterilization mode elapses the preset time, the controller 400 may control the second power supply 320 and the third power supply to be turned off, although not limited thereto.

However, the controller 400 may control, according to a command received from a user, the power supplies 310, 320, and 330 to terminate the sterilization mode of the electrostatic precipitator 1 and convert the sterilization mode to the dust collection mode.

That is, an existing electrostatic precipitator based on an electronic dust collecting method of collecting foreign materials by an electric field generated in a pair of electrodes has failed to prevent contaminations that are generated according to scattering of bio aerosols of foreign materials continuously collected on any ones of the pair of electrodes. However, the electrostatic precipitator 1 according to an embodiment of the disclosure may cause the second electrodes 250 to be heated and sterilized by additionally connecting the third power supply 330 for heating the second electrodes 250 to the second electrodes 250, while being easily driven selectively in any one mode of a dust collection mode or a sterilization mode. Accordingly, the electrostatic precipitator 1 may be prevented from being contaminated by foreign materials collected on the second electrodes 250, while preventing indoor air from being contaminated by scattering of a part of the collected foreign materials. The third power connector 290 may be additionally connected to the second electrodes 250 to heat the second electrodes 250, and because power having opposite polarities is respectively applied to the first electrodes 240 and the second electrodes 250, a very great potential difference may occur between the third power connector 290 and the first power connector 281, and accordingly, in a case in which the third power connector 290 is positioned close to the first power connector 281, a spark may occur.

To prevent this, at least one portion of the third power connector 290 may be covered by the second sheet 270 for the second sheet 270 to block the first power connector 281 from the third power connector 290. The second sheet 270, which is in a shape of a rectangle, may be configured such that a portion of the second sheet 270 includes a protruding shape of covering the third power connector 290.

Accordingly, a process of cutting the second sheet 270 for the second sheet 270 to include the protruding shape may be additionally needed, and an additional process for arranging the protruding shape with the third power connector 290 upon laminating of the second sheet 270 with the first sheet 260 may be needed, which raises production difficulty of the dust collecting sheet 210 and increases production cost according to additional processing of the second sheet 270.

To prevent this, the third power connector 290 may be positioned to be as far as possible from the first power connector 281 in the second direction Z.

The third power connector 290 may be adjacent to the other end **210*b* of the dust collecting sheet 210 in the second direction Z. Because the first power connector 281 is positioned at one end 210*a* of the dust collecting sheet 210 in the second direction Z, the third power connector 290 may be positioned to be as far as possible from the first power connector 281**.

A distance between the first power connector 281 and the third power connector 290 may be defined as a first distance d1 and a distance between the third power connector 290 and the second power connector 282 may be defined as a second distance d2. In this case, the third power connector 290 may be positioned such that the second distance d2 is shorter than the first distance d1.

By positioning the third power connector 290 to an opposite side of the first power connector 281, a spark that may occur between the first power connector 281 and the third power connector 290 while a dust collecting function of the dust collecting sheet 210 operates may be physically prevented.

Also, as described above, because the second sheet 270 does not need to cover the third power connector 290, the second sheet 270 may be cut to a rectangle without being cut to a complex shape and then laminated as it is to the first sheet 260, thereby simplifying a process of manufacturing the dust collecting sheet 210 and reducing production cost.

Figure 11:
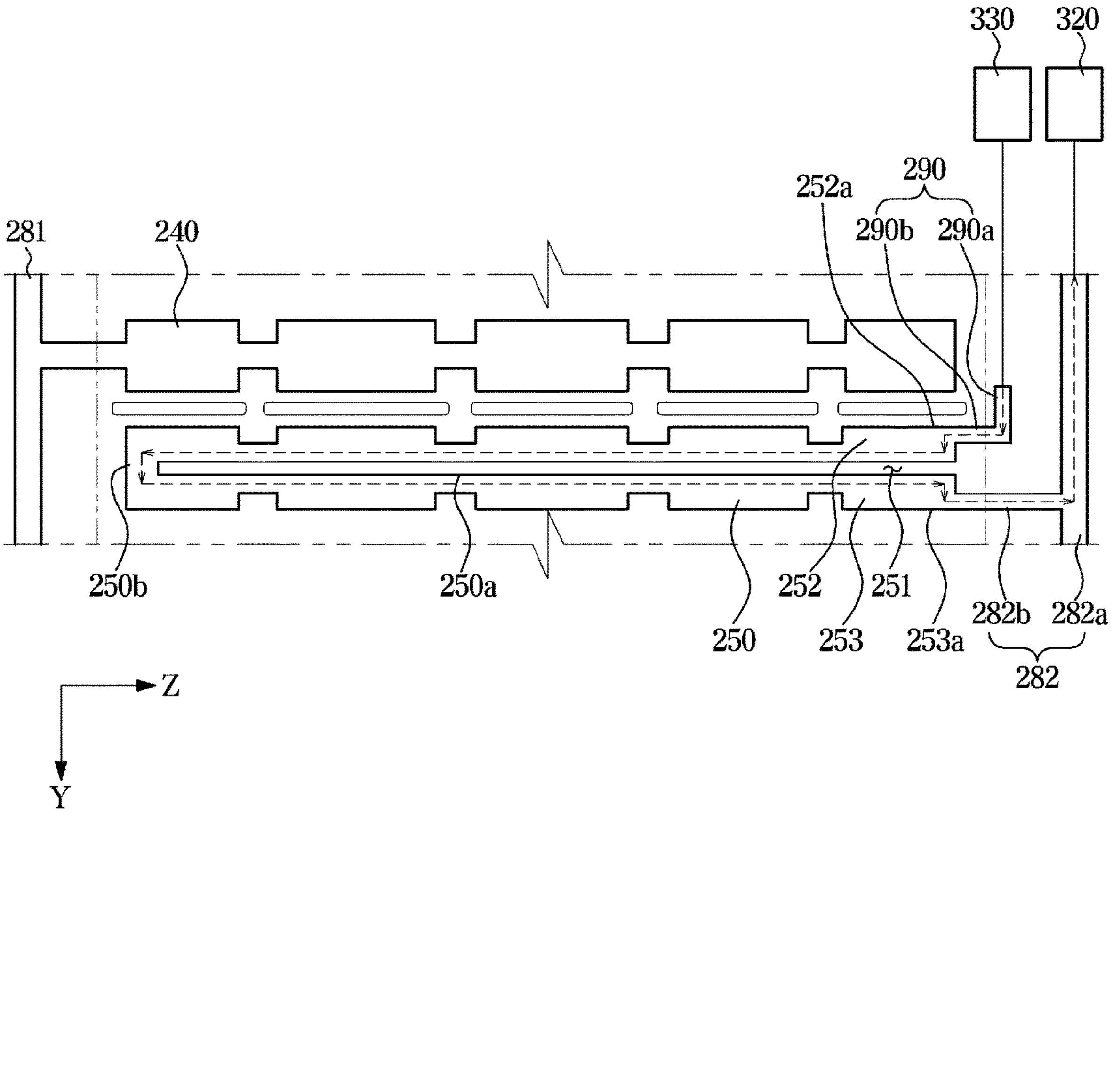
FIG. 11 schematically shows a flow of current upon heating of a second electrode of an electrostatic precipitator according to an embodiment of the disclosure.

FIG. 11 shows a connection between a dust collecting sheet and a power supply in an electrostatic precipitator according to an embodiment of the disclosure.

As described above, because the power connectors 281, 282, and 290 extend in the first direction X on the dust collecting sheet 210 before being bent, at least one portions of the power connectors 281, 282, and 290 may be positioned on the bending portions 211 upon bending of the dust collecting sheet 210 as shown in FIG. 11.

The first power supply 310 may include a first contact portion 311 that is in contact with the first power connector

281. The second power supply 320 may include a second contact portion 321 that is in contact with the second power connector 282. The third power supply 330 may include a third contact portion 331 that is in contact with the third power connector 290.

The contact portions 311, 321, and 331 may be in contact with the contact portions 281*a*, 282*a*, and 290*a* of the power connectors 281, 282, and 290, which are positioned on the bending portions 211. Upon bending of the dust collecting sheet 210, the power connectors 281, 282, and 290 positioned on the first flat surface 212 and the second flat surface 213 may be positioned on an inner side of a concavo-convex structure of the dust collecting sheet 210, formed by bending, which are not easily in contact with the outside.

However, the contact areas 281*a*, 282*a* and 290*a* of the power connectors 281, 282, and 290, positioned on the bending portions 211, may be easily exposed to the outside to be easily in contact with the contact portions 311, 321, and 331 extending from the outside.

Because the contact portions 311, 321, and 331 are in contact with the contact areas 281*a*, 282*a*, and 290*a* of the power connectors 281, 282, and 290, the power supplies 310, 320, and 330 may apply power to the first electrodes 240 and the second electrodes 250 according to a control by the controller 400.

Hereinafter, heating properties of the second electrodes 250 will be described in detail.

FIG. 11 schematically shows a flow of current upon heating of a second electrode of an electrostatic precipitator according to an embodiment of the disclosure.

As shown in FIG. 11, the second electrode 250 may include a cut portion 251 cut along a long side 250*a* in which the second electrode 250 extends. For example, the cut portion 251 may be cut in the second direction Z.

The cut portion 251 may extend in the second direction Z at a center portion of the second electrode 250 in the third direction Y.

The second electrode 250 may be partitioned into two portions with respect to the cut portion 251 in the third direction Y. The second electrode 250 may include a first portion 252 positioned at an upper side and a second portion 253 positioned at a lower side with respect to the cut portion 251 in the third direction Y.

The first portion 252 may be connected to the second portion 253 although the first portion 252 is partitioned from the second portion 253 by the cut portion 251. For example, at one end of the second electrode 250 in the second direction Z, the first portion 252 may be separated from the second portion 253 by the cut portion 251, and at another end 250*b* of the second electrode 250 in the second direction Z, the first portion 252 may be connected to the second portion 253.

For example, the second power connector 282 may be connected to the second portion 253 of the second electrode 250. The third power connector 290 may be provided at the first portion 252 of the second electrode 250.

For example, the third power connector 290 may be connected to the first portion 252 of the second electrode 250. The second power connector 282 may be provided at the second portion 253 of the second electrode 250.

For example, the third power connector 290 may be connected to one side 252*a* of the second electrode 250 in the third direction Y. The second power connector 282 may be connected to another side 253*a* of the second electrode 250 in the third direction Y.

The one side 252*a* may be a certain area positioned on one end in second direction Z of the first portion 252. The other side 253*a* may be a certain area positioned on one end in second direction Z of the second portion 253.

For example, the third connection area 290*b* may be connected to the one side 252*a* in the second direction Z. For example, the second connection area 282*b* may be connected to the other side 253*a* in the second direction Z.

Upon driving of the second power supply 320 and the third power supply 30 to heat the second electrodes 250, different voltages may be applied to the second power connector 282 and the third power connector 290 such that a potential difference occurs between the second power connector 282 and the third power connector 290.

A potential difference may occur between the second power connector 282 and the third power connector 290 such that current flows on the second electrodes 250 connected to the second power connector 282 and the third power connector 290.

For example, under an assumption that current flows from the third power connector 290 to the second power connector 282, the current may flow to the first portion 252 through the third contact area 290*a*, the third connection area 290*b*, and the one side 252*a*.

Because the first portion 252 is partitioned from the second portion 253 by the cut portion 251 and the first portion 252 is connected to the second portion 253 at the other end 250*b* of the second electrode 250 in the second direction Z, current may flow from the one side 252*a* to the other end 250*b* of the second electrode 250 through the first portion 252, flow to the second portion 253, and move to the second power connector 282 through the other side 253*a*, the second connection area 282*b*, and the second contact area 282*a*.

To cause current to flow along a path of passing through one end of the second electrode 250 from the third power connector 290 and returning to the second power connector 282 via the other end 250*b* of the second electrode 250, the cut portion 251 may be positioned at the center of the second electrode 250 in the third direction Y such that the second electrode 250 forms a U-shaped closed circuit, and accordingly, an entire area of the second electrode 250 may be heated uniformly. Hereinafter, the dust collecting sheet 210 according to another embodiment of the disclosure will be described. Other components which will be described below, except for the second electrode 250', may be the same as corresponding ones of the dust collecting sheet 210 according to an embodiment of the disclosure, and accordingly, overlapping descriptions will be omitted.

Figure 12:
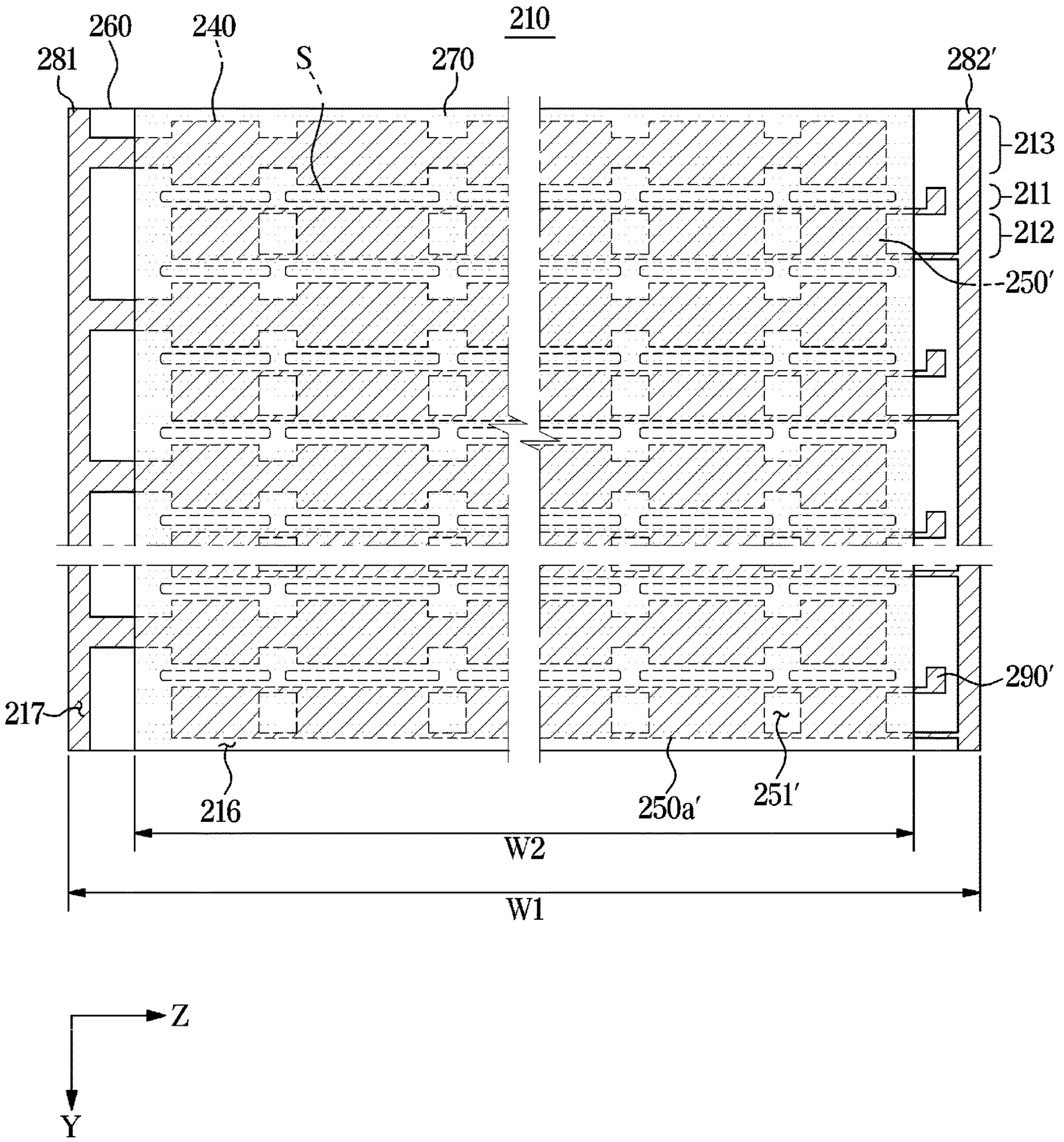
FIG. 12 is a top planar view showing a dust collecting sheet according to an embodiment of the disclosure before the dust collecting sheet is bent.
Figure 13:
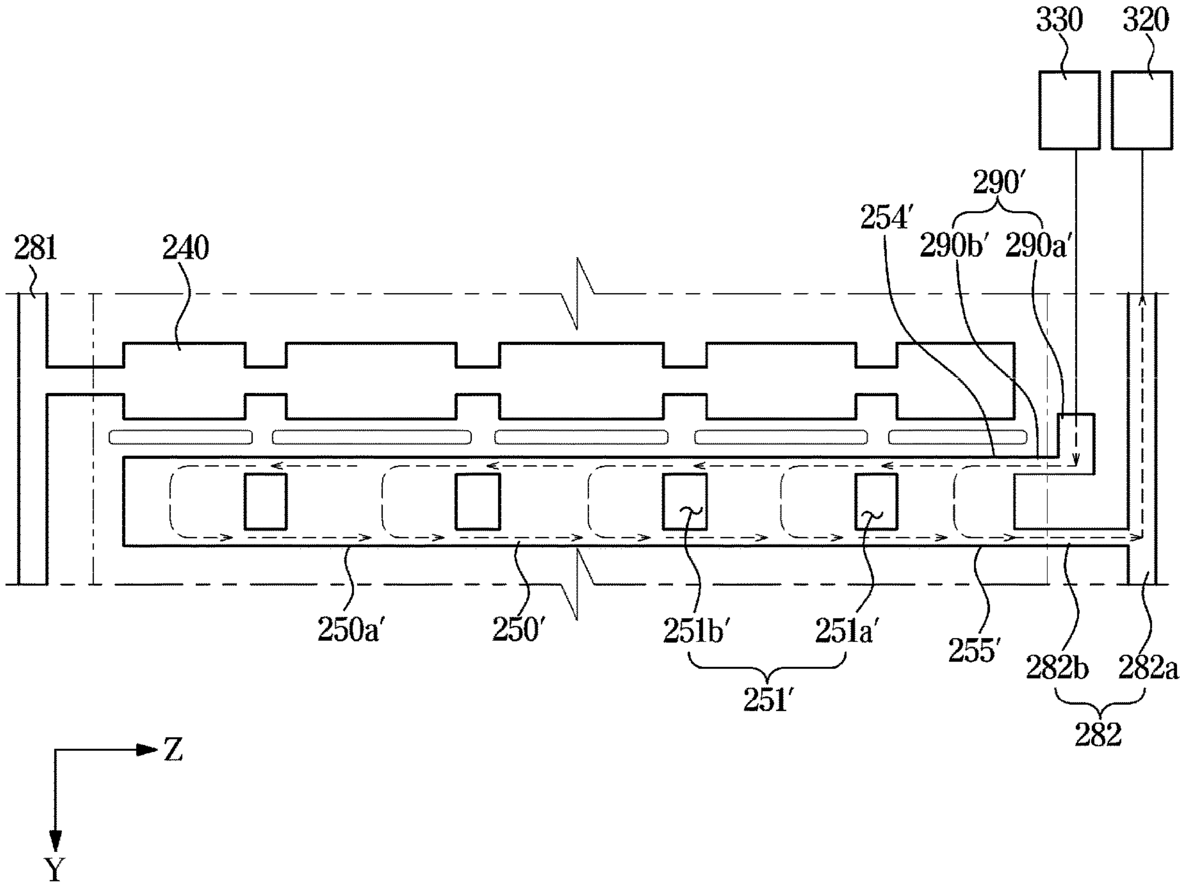
FIG. 13 schematically shows a flow of current upon heating of a second electrode of an electrostatic precipitator according to an embodiment of the disclosure.

FIG. 12 is a top planar view showing a dust collecting sheet according to an embodiment of the disclosure before the dust collecting sheet is bent, and FIG. 13 schematically shows a flow of current upon heating of a second electrode of an electrostatic precipitator according to an embodiment of the disclosure.

As shown in FIGS. 12 and 13, the second electrode 250' may include a cut portion 251' cut along a direction that is orthogonal to a long side 250*a'*. For example, the cut portion 251' may be cut along the third direction Y.

The cut portion 251' may include a first cut portion 251*a'* and a second cut portion 251*b'* spaced from the first cut portion 251*a'* in the second direction Z. For example, a plurality of cut portions 251' may be provided.

The second electrode 250' may be partitioned into two portions with respect to a center of the second electrode 250' in the third direction Y. The second electrode 250' may include a first portion 254' positioned at an upper side in the third direction Y, and a second portion 255' positioned at a lower side in the third direction Y.

Although the first portion 254' is partially partitioned from the second portion 255' by the cut portion 251' in the second direction Z, the first portion 254' may be connected to the second portion 255' in the third direction Y.

For example, the second power connector 282 may be connected to the second portion 255' of the second electrode 250'. The third power connector 290 may be provided at the first portion 254' of the second electrode 250'.

For example, the third power connector 290 may be connected to the first portion 254' of the second electrode 250'. The second power connector 282 may be provided at the second portion 255' of the second electrode 250'.

For example, the third connection area 290*b* may be connected to the first portion 254' in the second direction Z. For example, the second connection area 282*b* may be connected to the second portion 255' in the second direction Z.

Upon driving of the second power supply 320 and the third power supply 330 to heat the second electrodes 250', different voltages may be applied to the second power connector 282 and the third power connector 290 such that a potential difference occurs between the second power connector 282 and the third power connector 290.

According to occurrence of a potential difference between the second power connector 282 and the third power connector 290, current may flow on the second electrode 250 connected to the second power connector 282 and the third power connector 290.

For example, under an assumption that current flows from the third power connector 290 to the second power connector 282, the current may flow to the first portion 254' through the third contact area 290*a* and the third connection area 290*b*.

The current moved to the first portion 254' may move on the second electrode 250' except for the cut portion 251' to move to the second portion 255', and then move to the second power connector 282 through the second connection area 282*b* and the second contact area 282*a*.

According to a concept of the disclosure, by connecting a plurality of electrodes to a power supply for collecting dust and a power supply for heating the electrodes to sterilize the electrodes additionally, a dust collecting unit capable of sterilizing electrodes in addition to collecting dust may be provided, resulting in an improvement of cleanliness of an electrostatic precipitator.

According to a concept of the disclosure, because power connectors connected to a plurality of electrodes are arranged to be spaced apart from each other with preset distances, reliability of the electrostatic precipitator may be improved.

According to a concept of the disclosure, because a dust collecting unit is configured such that a plurality of electrodes are integrated into one body together with a dust collecting sheet and a power supply for dust collection and a power supply for sterilization are easily connected to the dust collecting unit formed as one body, an electrostatic precipitator capable of simplifying a manufacturing process and reducing manufacturing cost may be manufactured.

However, effects according to the concept of the disclosure are not limited to the above-mentioned effects, and other effects not mentioned will be clearly understood by one of ordinary skill in the technical field to which the disclosure belongs from the following descriptions.

So far, specific embodiments have been shown and described, however, the disclosure is not limited to these embodiments. It should be interpreted that various modifications may be made by one of ordinary skill in the technical art to which the disclosure belongs, without deviating from the gist of the technical concept of the disclosure, which is defined in the following claims.

What is claimed is:

1. An electrostatic precipitator comprising:
- a charging unit configured to charge foreign materials; and
- a dust collecting sheet configured to collect the foreign materials charged in the charging unit, the dust collecting sheet comprising:
  - a first electrode;
  - a second electrode spaced apart from the first electrode to face the first electrode by overlapping with the first electrode in a first direction, and configured to collect the foreign materials passed through the charging unit, the second electrode including:
    - a long side extending along a second direction that is orthogonal to the first direction; and
    - a cut portion cut along the long side in the second direction;
  - a first power connector connected to the first electrode, and configured to apply a voltage to the first electrode, the first power connector being at one end of the dust collecting sheet in the second direction;
  - a second power connector electrically connected to one side of the second electrode in the third direction that is orthogonal to the first direction and the second direction with respect to the cut portion, and configured to apply a voltage to generate a potential difference with respect to the first electrode to the second electrode, the second power connector being at an other end of the dust collecting sheet in the second direction; and
  - a third power connector connected to an other side of the second electrode in the third direction with respect to the cut portion, and configured to heat the second electrode,
- wherein the third power connector is closer to the other end of the dust collecting sheet in the second direction than to the one end of the dust collecting sheet so that the third power connector is closer to the second power connector than to the first power connector.

2. The electrostatic precipitator of claim 1, wherein the first power connector includes:
- a first contact area extending in the third direction that is orthogonal to the first direction and to the second direction, the first contact area being in contact with a first power supply configured to supply power to the first electrode; and
- a first connection area extending in the second direction, and to electrically connect the first connection area to the first electrode, the second power connector includes:
- a second contact area extending in the third direction and being in contact with a second power supply configured to supply power to the second electrode; and
- a second connection area extending in the second direction, and to electrically connect the second connection area to the second electrode, and the third power connector includes:
- a third contact area extending in the third direction, and being in contact with a third power supply configured to supply power to the second electrode; and
- a third connection area extending in the second direction, and to electrically connect the third connection area to the second electrode.

3. The electrostatic precipitator of claim 2, wherein the first contact area extends in the third direction along an entire of one end of the dust collecting sheet in the second direction, the second contact area extends in the third direction along an entire of another end of the dust collecting sheet in the second direction, and at least one portion of the third contact area extends in the third direction in an inner side of the dust collecting sheet in the second direction.

4. The electrostatic precipitator of claim 2, wherein:

the second connection area is connected to the one side of the second electrode in the third direction with respect to the cut portion; and the third connection area is connected to the other side of the second electrode in the third direction with respect to the cut portion.

5. An electrostatic precipitator comprising:

a charging unit configured to charge foreign materials; and a dust collecting sheet configured to collect the foreign materials charged in the charging unit, the dust collecting sheet comprising:

a first electrode;

a second electrode spaced apart from the first electrode to face the first electrode by overlapping with the first electrode in a first direction, and configured to collect the foreign materials passed through the charging unit, the second electrode including:

a long side extending along a second direction that is orthogonal to the first direction; and a cut portion cut along a third direction that is orthogonal to the first direction and to the second direction;

a first power connector connected to the first electrode, and configured to apply a voltage to the first electrode, the first power connector being at one end of the dust collecting sheet in the second direction;

a second power connector to be electrically connected to one side of the second electrode in a third direction that is orthogonal to the first direction and the second direction, and configured to apply a voltage to generate a potential difference with respect to the first electrode to the second electrode, the second power connector being at an other end of the dust collecting sheet in the second direction; and a third power connector is connected to an other side of the second electrode in the third direction, and configured to heat the second electrode, wherein the third power connector is closer to the other end of the dust collecting sheet in the second direction than to the one end of the dust collecting sheet so that the third power connector is closer to the second power connector than to the first power connector.

6. The electrostatic precipitator of claim 1, wherein the cut portion includes a first cut portion and a second cut portion spaced apart from the first cut portion in the second direction.

7. The electrostatic precipitator of claim 1, wherein the dust collecting sheet includes:

a first sheet covering one surface of the first electrode and the second electrode in the first direction; and a second sheet covering an other surface of the first electrode and the second electrode in the first direction, and the first power connector, the second power connector, and the third power connector are positioned outside the second sheet.

8. The electrostatic precipitator of claim 7, wherein the dust collecting sheet includes:

a first area in which the first sheet overlaps with the second sheet in the first direction; and a second area outside the second sheet in the first direction, and the first power connector, the second power connector, and the third power connector are in the second area.

9. The electrostatic precipitator of claim 1, wherein the second electrode is made of a metal material.

10. The electrostatic precipitator of claim 1, wherein the second electrode is made of a material having higher electrical resistance than the first electrode.

11. The electrostatic precipitator of claim 1, wherein the dust collecting sheet further includes:

a first surface which the first electrode is thereon;

a second surface which the second electrode is thereon; and a bending portion disposed between the first surface and the second surface, and being bent so that the first surface faces the second surface in the first direction, and thereby the first electrode faces the second electrode, at least one portion of each of the first power connector, the second power connector, and the third power connector is on the bending portion.

12. The electrostatic precipitator of claim 2, further comprising a controller configured to control the first power supply, the second power supply, and the third power supply, wherein the controller is configured to operate the electrostatic precipitator in one of a first mode and a second mode, and to change a mode between the first mode and the second mode based on the controlling of the first power supply, the second power supply, and the third power supply, and the first mode is in which the first power supply and the second power supply are controlled to apply a voltage to each of the first power connector and the second power connector, respectively, and the second mode is in which the second power supply and the third power supply are controlled to apply a voltage to each of the second power connector and the third power connector, respectively.

13. The electrostatic precipitator of claim 12, wherein the controller is configured to turn on the first mode and then turn off the first mode based on a preset time or an input value, and to turn on the second mode for a preset time after the first mode is turned off and then turn off the second mode.

14. An electrostatic precipitator comprising:

a charging unit configured to charge foreign materials; and a dust collecting sheet configured to collect the foreign materials charged in the charging unit, wherein the dust collecting sheet comprises:

a first electrode;

a second electrode spaced apart from the first electrode to face the first electrode in a first direction, extending in a second direction that is orthogonal to the first direction, and configured to collect the foreign materials passed through the charging unit, the second electrode including a cut portion cut along the second direction, a first power connector connected to the first electrode, configured to apply a voltage to the first electrode, and being at one end of the dust collecting sheet in the second direction;

a second power connector connected to one side of the second electrode in a third direction that is orthogonal to the first direction and to the second direction with respect to the cut portion, and configured to apply a voltage to generate a potential difference with respect to the first electrode to the second electrode, the second power connector being at an other end of the dust collecting sheet in the second direction; and a third power connector additionally connected to an other side of the second electrode in the third direction with respect to the cut portion, and configured to heat the second electrode, the third power connector being closer to the other end of the dust collecting sheet in the second direction than to the one end of the dust collecting sheet.

15. The electrostatic precipitator of claim 14, wherein the first power connector includes:

a first contact area extending in a third direction that is orthogonal to the first direction and to the second direction, the first contact area being in contact with a first power supply configured to supply power to the first electrode; and a first connection area extending in the second direction and to electrically connect the first connection area to the first electrode, the second power connector includes:

a second contact area extending in the third direction and being in contact with a second power supply configured to supply power to the second electrode; and a second connection area extending in the second direction and to electrically connect the second connection area to the second electrode, and the third power connector includes:

a third contact area extending in the third direction and being in contact with a third power supply configured to supply power to the second electrode; and a third connection area extending in the second direction and to electrically connect the third connection area to the second electrode.

16. The electrostatic precipitator of claim 15, wherein:

the second connection area is connected to the one side of the second electrode in a third direction that is orthogonal to the first direction and to the second direction with respect to the cut portion; and the second contact area extends in the third direction along an entire of the other end of the dust collecting sheet in the second direction.

17. The electrostatic precipitator of claim 16, wherein the third connection area is connected to the other side of the second electrode in the third direction that is orthogonal to the first direction and to the second direction with respect to the cut portion, and at least one portion of the third contact area extends in the third direction in an inner side of the dust collecting sheet in the second direction.

* * * * *